(12) United States Patent
Horikoshi et al.

(10) Patent No.: US 6,269,170 B1
(45) Date of Patent: Jul. 31, 2001

(54) METHOD AND SYSTEM FOR PRODUCING COMPUTER GENERATED HOLOGRAMS REALIZING REAL TIME HOLOGRAPHIC VIDEO PRODUCTION AND DISPLAY

(75) Inventors: Tsutomu Horikoshi; Kazuhito Higuchi; Takaaki Akimoto; Satoshi Suzuki, all of Kanagawaken (JP)

(73) Assignee: Nippon Telegraph & Telephone (JP)

(*) Notice: Subject to any disclaimer, the term of this patent is extended or adjusted under 35 U.S.C. 154(b) by 0 days.

(21) Appl. No.: 09/532,257

(22) Filed: Mar. 22, 2000

Related U.S. Application Data

(62) Division of application No. 08/985,817, filed on Dec. 5, 1997, now Pat. No. 6,130,957.

(30) Foreign Application Priority Data

| Dec. 6, 1996 | (JP) | 8-326514 |
| Feb. 27, 1997 | (JP) | 9-43080 |
| Mar. 27, 1997 | (JP) | 9-74969 |

(51) Int. Cl.$^7$ ............... G06T 7/00; G03H 1/08
(52) U.S. Cl. ............ 382/100; 382/210; 348/40; 359/9
(58) Field of Search ............... 382/210, 106, 382/107, 100, 211; 250/550; 356/347; 348/40; 359/9, 22, 23

(56) References Cited

U.S. PATENT DOCUMENTS

| 3,888,561 | * | 6/1975 | Kurtz | 359/26 |
| 4,279,462 | * | 7/1981 | Ersoy | 359/10 |
| 4,408,277 | * | 10/1983 | Cortellini et al. | 348/41 |
| 5,347,375 | * | 9/1994 | Saito et al. | 359/9 |
| 5,515,183 | * | 5/1996 | Hashimoto | 359/9 |
| 5,724,447 | * | 3/1998 | Fukushima | 382/211 |

OTHER PUBLICATIONS

Sato et al. "Holographic Television by Liquid Crystal Device." 3$^{rd}$ Int. Conf. on Holographic Systems, Components and Applications, pp. 20–23, 1991.*

Hariharan. "Optical Holography." Cambridge University Press, pp. 146–161, 1984.*

* cited by examiner

Primary Examiner—Jon Chang
(74) Attorney, Agent, or Firm—Kilpatrick Stockton LLP

(57) ABSTRACT

A scheme for producing computer generated holograms in which a motion vector of each object to be displayed is detected, objects are classified according to their motions, a hologram fringe pattern for each classified group of objects is calculated separately by image processing stored basic patterns, and a hologram to be displayed is produced, by synthesizing all separately calculated hologram fringe patterns. In another aspect, a gaze point of the observer is determined, and a hologram to be displayed is produced by using high resolution hologram fringe patterns for objects located at the gaze point and low resolution hologram fringe patterns for regions other than the gaze point. In another aspect, a distance between each display target object and a hologram plane is obtained, a region of calculations for interference fringes due to each display target object is limited according to the obtained distance, interference fringes due to each display target object are separately calculated within the limited region of calculations, and a hologram to be displayed is produced by synthesizing separately calculated interference fringes due to all display target objects.

6 Claims, 18 Drawing Sheets

FIG.14
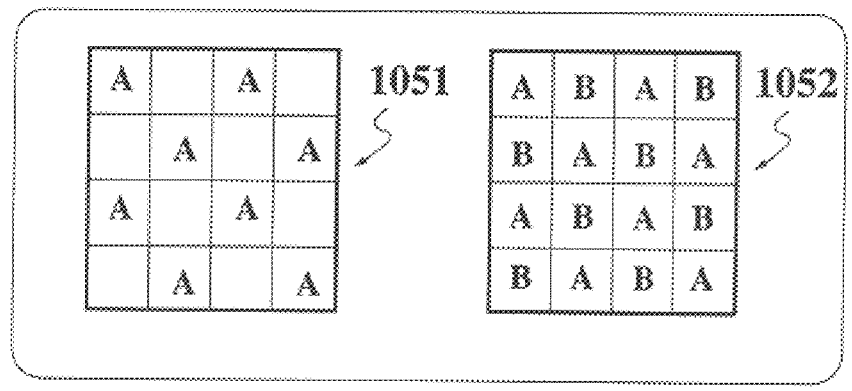
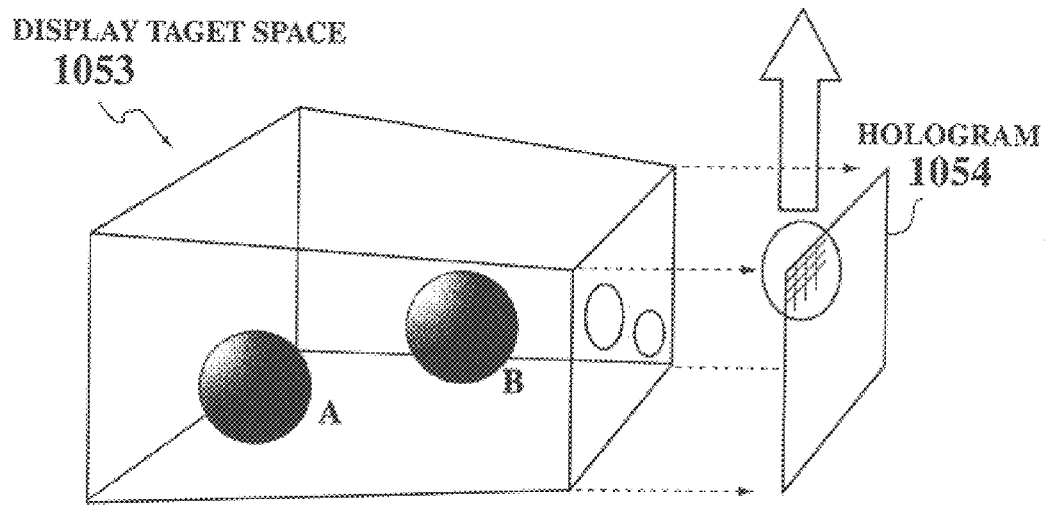
FIG.15
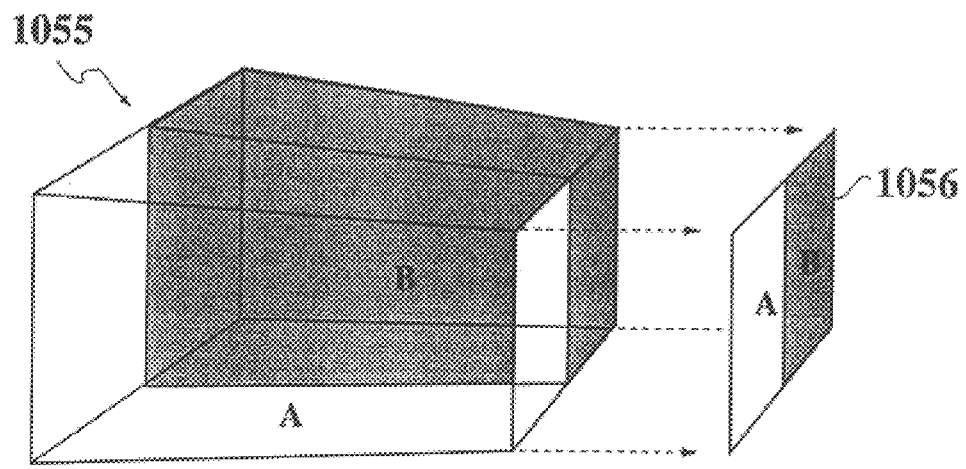

METHOD AND SYSTEM FOR PRODUCING COMPUTER GENERATED HOLOGRAMS REALIZING REAL TIME HOLOGRAPHIC VIDEO PRODUCTION AND DISPLAY

CROSS-REFERENCE TO RELATED APPLICATION

This is a divisional application of U.S. Ser. No. 08/985,817 filed Dec. 5, 1997 and now U.S. Pat. No. 6,130,957.

BACKGROUND OF THE INVENTION

1. Field of the Invention

The present invention relates to a computer generated hologram display technique for obtaining interferences between a wavefront of light from an object and a wavefront of a reference light by calculations, and displaying the resulting interference fringes as a hologram representing a three-dimensional image.

2. Description of the Background Art

The conventionally known methods for producing computer generated holograms include a method using FFT (Fast Fourier Transform) (see W. H. Lee, "Sampled Fourier Transform Hologram Generated by Computer", Applied Optics, Vol. 9, No. 3, pp. 639–643, 1970, for example) and a method in which an object is described as a set of point objects and wavefronts of lights from the point objects are synthesized (see J. P. Waters, "Holographic Image Synthesis Utilizing Theoretical Methods", Applied Physics Letters, Vol. 9, No. 11, 1966, for example).

The former method has an advantage in that the computation can be carried out at relatively high speed for a discretized flat plane object, but it presupposes the use of a flat plane object as its processing target so that a three-dimensional object must be displayed as a set of plural cross-sections. For this reason, the advantage due to the high speed characteristic of the FFT becomes less significant as a required number of cross-sections increases, and the computation can be rather slow when a display target space is to be enlarged or a resolution is to be raised. On the other hand, the latter method requires a longer computation time because of the description using point objects, but it is unaffected by the size or the resolution of the display target space so that it is suitable for producing holograms in high resolution and wide viewfield.

In the method for describing an object by a set of point objects, these point objects are regarded as point light sources, and a wavefront of light reflected from the object is calculated by synthesizing wavefronts of lights generated from these point light sources. Namely, in an exemplary coordinate system for calculating computer generated holograms, the orthogonal coordinates with an origin on a hologram plane is defined and a position of a point light source is defined as $P(x_0, y_0, z_0)$. Then, when the reference light is assumed to be a plane wave R. the wavefronts of light from the point light source P and the reference light can be expressed in terms of complex amplitudes as follows.

$$P = (a/r)e^{jkr}, \quad R = Ae^{jkr} \quad (1)$$

In the computational holography, these two wavefronts are synthesized and a hologram is obtained by the calculating the following quantity.

$$|P+R|^2 \quad (2)$$

However, in the latter method, the holographic video display has been realized by calculating in advance all the frames to be presented, storing the calculated results in a storage device such as real time disk device, and reading the stored data at high speed.

There are also some attempts for high speed real time calculation of the interference fringes using a supercomputer and the like (see M. Lucente and T. A. Galyean, "Rendering Interactive Holographic Images", Computer Graphics (SIGGRAPH'95), pp. 387–394, 1995, for example), but these attempts basically adopt a scheme in which each frame is to be calculated independently, so that the resolution and the size of a display image that can actually be computed have been limited.

There is also a proposition for reducing an amount of hologram calculations by utilizing difference data of display images (see, H. Takahashi, et al., "Direct volume access by an improved electro-holography image generator" SPIE, Vol. 2406, pp. 220–225, 1995), but this proposition only decomposes a display target object into a plurality of parts and carries out addition or subtraction of interference fringes for each part, so that this proposition cannot realize an effective reduction of an amount of calculations for the video display.

Thus, in the production of interference fringes in real time by a computer, the following problems are encountered in practice.

(1) An amount of calculations required by a scheme for calculating each frame independently is so large that, at present, the video production is impossible unless a supercomputer is employed.

(2) In the scheme for calculating each frame independently, when an area of the hologram is increased or a number of objects is increased beyond some limit, it becomes impossible to realize the real time calculation even by massively parallel processing machines, so that there is a limit to the video display using a scheme for producing interference fringes for each frame independently.

Now, in the production of computer generated holograms, there is a need to display interference fringes at high resolution in order to cause the diffraction of light. To this end, it is necessary to process an enormous number of pixels far greater than those processed in a conventional high precision display device such as HDTV, even when a display screen is small. Also, in the interference fringe calculations, a value obtained by synthesizing the wavefronts of lights from the entire display target object is going to be a value at each point (pixel) of the interference fringes, so that the major problem to be resolved is an increase in an amount of calculations due to an increase in a number of pixels to be displayed.

One way of resolving this problem is a method which provides the high resolution display only at a gaze point based on a gaze detection, which is a two-dimensional large screen display method. This method follows a line of gaze and displays only objects on the line of gaze at high resolution, so as to reduce an amount of calculations required for producing images to be displayed and to enable a large screen display at the same time.

On the other hand, in the binocular disparity display device such as HMD, there is a proposition in which lines of gaze for left and right eyes are detected and a gaze point (focal length) of an observer is detected from the intersection of the detected lines of gaze, and then objects in a gazed region are displayed in focus (see S. Shiwa et al., "Proposal for a 3-D display with accommodative compensation: 3DDAC", Journal of the SID, 4/4, pp. 255–262, 1996).

However, the above described line of gaze following type hologram display method has been associated with the following problem. Namely, in the conventional method for displaying projected images, an area of a region to be displayed at high resolution on the screen is nearly constant as long as a distance between eyes and the display screen is constant. For this reason, an amount of calculations required for the display target image production can also be considered nearly constant. In this case, as shown in FIG. 1, an observer 13 can observe a space 11 through a hologram plane (projection plane) 12, and the gazing target objects in this space 11 are located within a view volume 14 (a gazing target space on the line of gaze). In the conventional method, it has been sufficient to produce projected images of objects in this view volume 14 only within a gazed region 15 (an intersection region between the view volume 14 and the hologram plane 12).

However, in a case of the holography, an image of a single target object is not produced at a particular region on the hologram plane alone but rather the image is produced by synthesizing diffracted lights from the hologram plane, so that there is a need to calculate wavefronts from that target object over the entire hologram plane. In other words, even when the calculation target objects are limited to those objects within the view volume centered around the line of gaze, a region for calculating interference fringes as the hologram is still the entire hologram plane, and a significant reduction in an amount of calculations cannot be realized.

Also, even when the targets are limited to the view volume within the display space, there can be cases where many target objects exist within that view volume depending on a direction of the line of gaze, so that a reduction in an amount of calculations is limited in this regard.

On the other hand, means for displaying computer generated holograms include a display device using acoustic elements (see S. A. Benton, "Experiments in Holographic Video Imaging", 3D Forum, Vol. 5, No. 2, pp. 36–56, 1991, for example) and a display device using liquid crystals (see T. Sonehara, et al., "Moving 3D-CGH Reconstruction Using a Liquid Crystal Spatial Wavefront Modulator", JAPAN DISPLAY '92, pp. 315–318, 1992, for example), and they are expected to be capable of displaying video images.

However, an area that can be displayed by any of these display devices Is extremely small so that a hologram displayed on it is usually viewed by a single eye or in enlargement using lenses. But the use of a larger screen is indispensable in order to increase the realistic sense, and it is physically difficult to realize a larger screen by using a display device according to any of these conventional means so that conventionally the use of a larger screen has been realized by arranging a plurality of display devices.

Moreover, in the holography, in order to display interference fringes as the hologram, the required resolution is much higher than that used in the conventional display device such as TV. In the conventional display device, a pixel width Is at most several tens of $\mu$m, but in the hologram display, a display device with a pixel pitch below sub-micron order is required ideally. Consequently, in order to display the hologram by using a screen of the same size, a required resolution will be as high as several tens of thousand times higher. In other words, the hologram production can be considered equivalent to the production of an image in an enormous area. Thus a required amount of calculations for the display image production is enormous in the holography and even in a case of using a provision for arranging a plurality of display devices, an amount of calculations required for computer generated holograms has been the major problem.

In particular, in the holographic video production, there is a need to product a plurality of Interference fringes at high speed so that the suppression of an increase in an amount of calculations is even more serious problem than a case of using a larger screen. As a method for calculating interference fringes at high speed by reducing a required amount of calculations, there is a proposition for re-calculating only moved portions, but even in this method, a required amount of calculations increases as a number of display objects increases and when an area of the display screen is increased, so that there still remains the problem that the holographic video display becomes difficult in such cases.

As described, in the conventional hologram display technique, there is a problem regarding an enormous amount of calculations required by the use of a larger screen and the video display, and this problem largely stems from the nature of the holography. Namely, the holography records interferences of wavefronts of lights emitted by an object in all directions as well as their interferences with a wavefront of the reference light, and lights from the object are propagated in all directions, so that even in a case of calculating the interference fringes for the hologram of only a point object, it is necessary to calculate the wavefronts of lights over the entire hologram plane. Therefore, a required amount of calculations is naturally increased in proportion to an increase in the hologram display area.

SUMMARY OF THE INVENTION

It is therefore an object of the present invention to provide a method and a system for producing computer generated holograms which are capable of realizing real time holographic video production and display based on high speed hologram calculations.

It is another object of the present invention to provide a method and a system for producing computer generated holograms which are capable of efficiently realizing high resolution and highly realistic three-dimensional video display based on the human visual sense characteristics.

It is another object of the present invention to provide a method and a system for producing computer generated holograms which are capable of producing holograms by high speed interference fringe calculations not depending on an area of a display screen.

According to one aspect of the present invention there is provided a method for producing computer generated holograms in a form of holographic video by calculating hologram fringe patterns, comprising the steps of: storing basic patterns for wavefronts of lights from objects; detecting a motion vector of each object to be displayed after a prescribed time; classifying the objects into a plurality of groups according to motions of the objects indicated by the motion vector of each object, such that objects in an identical motion are classified as belonging to an identical group; calculating a hologram fringe pattern for each classified group of objects separately by initially using a corresponding one of the basic patterns and subsequently image processing each calculated hologram fringe pattern; and producing a hologram to be displayed after the prescribed time by synthesizing all separately calculated hologram fringe patterns.

According to another aspect of the present invention there is provided a method for producing computer generated holograms, comprising the steps of: determining a gaze point of the observer indicating a distance up to objects gazed by the observer; and producing a hologram to be displayed, using high resolution hologram fringe patterns for objects located at the gaze point and low resolution hologram fringe patterns for regions other than the gaze point.

According to another aspect of the present invention there is provided a method for producing computer generated holograms, comprising the steps of: obtaining a distance between each display target object and a hologram plane; limiting a region of calculations for interference fringes due to each display target object according to the distance obtained by the obtaining step; separately calculating interference fringes due to each display target object within the region of calculations as limited by the limiting step; and producing a hologram to be displayed, by synthesizing separately calculated interference fringes due to all display target objects.

According to another aspect of the present invention there is provided a method for producing computer generated holograms, comprising the steps of: obtaining a distance between each display target object and a hologram plane; limiting a region of calculations for interference fringes due to each near distanced display target objects for which the distance obtained by the obtaining step is not greater than a prescribed threshold; separately calculating interference fringes due to each near distanced display target object within the region of calculations as limited by the limiting step; collectively calculating interference fringes due to far distanced display target objects for which the distance obtained by the obtaining step is greater than the prescribed threshold, as a projected image; and producing a hologram to be displayed, by synthesizing interference fringes calculated by the separately calculating step and interference fringes calculated by the collectively calculating step.

According to another aspect of the present invention there is provided a method for producing computer generated holograms, comprising the steps of: calculating interference patterns due to all display target objects; detecting moving display target objects whose positions have been changed among the display target objects; obtaining a distance between each moving display target object and a hologram plane; limiting a region of calculations for interference fringes due to each moving display target objects according to the distance obtained by the obtaining step; separately re-calculating interference fringes due to each moving display target object within the region of calculations as limited by the limiting step; and producing a hologram to be displayed, by synthesizing interference fringes calculated by the calculating step and interference fringes re-calculated by the separately re-calculating step.

According to another aspect of the present invention there is provided a system for producing computer generated holograms in a form of holographic video by calculating hologram fringe patterns, comprising: a memory unit for storing basic patterns for wavefronts of lights from objects; a motion detection unit for detecting a motion vector of each object to be displayed after a prescribed time; a classification unit for classifying the objects into a plurality of groups according to motions of the objects indicated by the motion vector of each object, such that objects in an identical motion are classified as belonging to an identical group; a calculation unit for calculating a hologram fringe pattern for each classified group of objects separately by initially using a corresponding one of the basic patterns and subsequently image processing each calculated hologram fringe pattern; and a hologram production unit for producing a hologram to be displayed after the prescribed time by synthesizing all separately calculated hologram fringe patterns.

According to another aspect of the present invention there is provided a system for producing computer generated holograms, comprising: a gaze point detection unit for determining a gaze point of the observer indicating a distance up to objects gazed by the observer; and a hologram production unit for producing a hologram to be displayed, using high resolution hologram fringe patterns for objects located at the gaze point and low resolution hologram fringe patterns for regions other than the gaze point.

According to another aspect of the present invention there is provided a system for producing computer generated holograms, comprising: a distance detection unit for obtaining a distance between each display target object and a hologram plane; a region limiting unit for limiting a region of calculations for interference fringes due to each display target object according to the distance obtained by the distance detection unit; a calculation unit for separately calculating interference fringes due to each display target object within the region of calculations as limited by the region limiting unit; and a hologram production unit for producing a hologram to be displayed, by synthesizing separately calculated interference fringes due to all display target objects.

According to another aspect of the present invention there is provided a system for producing computer generated holograms, comprising: a distance detection unit for obtaining a distance between each display target object and a hologram plane; a region limiting unit for limiting a region of calculations for interference fringes due to each near distanced display target objects for which the distance obtained by the distance detection unit is not greater than a prescribed threshold; a first calculation unit for separately calculating interference fringes due to each near distanced display target object within the region of calculations as limited by the region limiting unit; a second calculation unit for collectively calculating interference fringes due to far distanced display target objects for which the distance obtained by the distance detection unit is greater than the prescribed threshold, as a projected image; and a hologram production unit for producing a hologram to be displayed, by synthesizing interference fringes calculated by the first calculation unit and interference fringes calculated by the second calculation unit.

According to another aspect of the present invention there is provided a system for producing computer generated holograms, comprising: a first calculation unit for calculating interference patterns due to all display target objects; a motion detection unit for detecting moving display target objects whose positions have been changed among the display target objects; a distance detection unit for obtaining a distance between each moving display target object and a hologram plane; a region limiting unit for limiting a region of calculations for interference fringes due to each moving display target objects according to the distance obtained by the distance detection unit; a second calculation unit for separately re-calculating interference fringes due to each moving display target object within the region of calculations as limited by the region limiting unit; and a hologram production unit for producing a hologram to be displayed, by synthesizing interference fringes calculated by the first calculation unit and interference fringes re-calculated by the second calculation unit.

Other features and advantages of the present invention will become apparent from the following description taken in conjunction with the accompanying drawings.

BRIEF DESCRIPTION OF THE DRAWINGS

FIG. 14 is a schematic diagram showing an exemplary display target space and pixel patterns that can be used in calculating interference fringes according to the second embodiment of the present invention.

FIG. 15 is a schematic diagram showing another exemplary display target space that can be used in calculating interference fringes according to the second embodiment of the present invention.

DETAILED DESCRIPTION OF THE PREFERRED EMBODIMENTS

Figure 1:
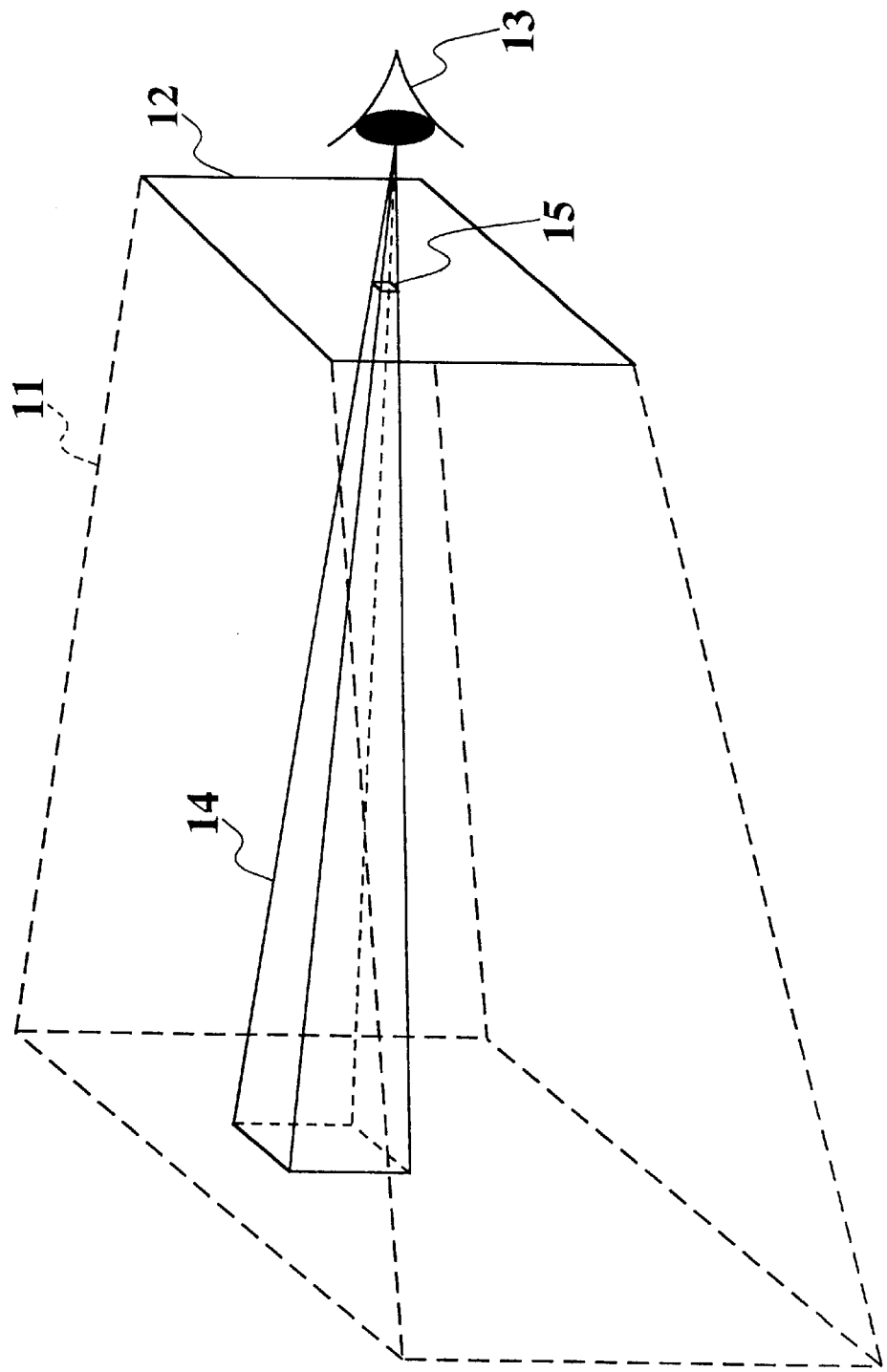
FIG. 1 is a schematic diagram showing a view volume that is conventionally used in reducing an amount of calculations for hologram production.

Referring now to FIG. 2 to FIG. 10, the first embodiment of a method and a system for producing computer generated holograms according to the present invention will be described in detail.

In short, in this first embodiment, interference fringes are deformed by utilizing motion information, so as not to carry out the re-calculation of the fringes from the beginning. In other words, motions of objects in the display target are classified, and for each group of objects which are in each classified motion, the interference patterns of lights projected onto a hologram plane are produced. The interference patterns for different classified motions so produced are then stored in separate buffers. In this manner, the interference patterns are deformed in accordance with a type of individual motion and the buffer is rewritten accordingly. After the interference fringe deformation processing for all classified motions are finished, contents of all the buffers are synthesized together to produce final interference fringes of the display target.

In this first embodiment, the motions of the display target are set in correspondence to the change in the interference fringes, so that there is no need to repeat calculating the interference fringes from individual point light sources. Thus, there is no need to re-execute multiplication and addition calculations for wavefronts of point objects every time an object moves, and therefore it is possible to present the interference fringes for a next frame at high speed. As a result, it becomes possible to produce the real time holographic video display easily, without using a supercomputer.

As for the depth direction, the basic fringe pattern obtained by calculations in advance are stored so that, even when an object moves in directions of (x, y, z) axes simultaneously, it suffices to read out the basic pattern for the fringes corresponding to z first, and then translate this basic pattern parallel along (x, y) directions, so that the computation time can be reduced considerably.

Now, with references to the drawings, this first embodiment will be described in further detail.

First, the relationship between the interference fringes of the hologram and the motion will be described for an exemplary case of the light diffraction in the Fresnel region. In this case, an amplitude distribution $u(\xi, \eta)$ for a diffraction image of an object $g(x, y)$ can be given by the following equation (3).

$$u(\xi, \eta) = const \int \int g(x, y) \exp\left( ik \frac{(x-\xi)^2 + (y-\eta)^2}{2x} \right) dx dy \quad (3)$$

(A) Parallel Translation of the Object:

In a case where the object $g(x, y)$ is translated parallel as much as $(x_\theta, y_\theta)$ on the x-y plane, the amplitude distribution $u'(\xi, \eta)$ will be given by the following equation (4).

$$u'(\xi, \eta) = \\ const \int \int g(x-x_\theta, y-y_\theta) \exp\left( 2\pi i \frac{(\xi-x)^2 + (\eta-y)^2}{2x\lambda} \right) dx dy \quad (4)$$

When one puts $x-x_\theta=x'$ and $y-y_\theta=y'$ in the above equation (4), one obtains the following equation (5).

$$u'(\xi, \eta) = \qquad (5)$$

$$const \int\int g(x', y')\exp\left(2\pi i \, \frac{(\xi - x_\theta - x')^2 + (\eta - y_\theta - y')^2}{2x\lambda}\right) dx'dy'$$

Thus the diffraction image is simply displaced in the same directions as much as $(x_\theta, y_\theta)$.

(B) Rotation of the Object:

In a case where the object is rotated for θ around the origin, the diffraction image of the object also rotates for the same θ in the same direction, because the coordinates of the diffraction image plane are selected to be parallel to the coordinates of the object plane. In other words, when the coordinates of the diffraction image plane are rotated for θ, a pattern of the diffraction image does not change. Namely, the object is rotated for θ without changing a pattern of the diffraction image.

As described, in a case the object motion is the translational motion on the x-y plane and/or the rotational motion around the origin, it suffices to carry out the translation and/or rotation operations on the interference fringes themselves.

Figure 2:
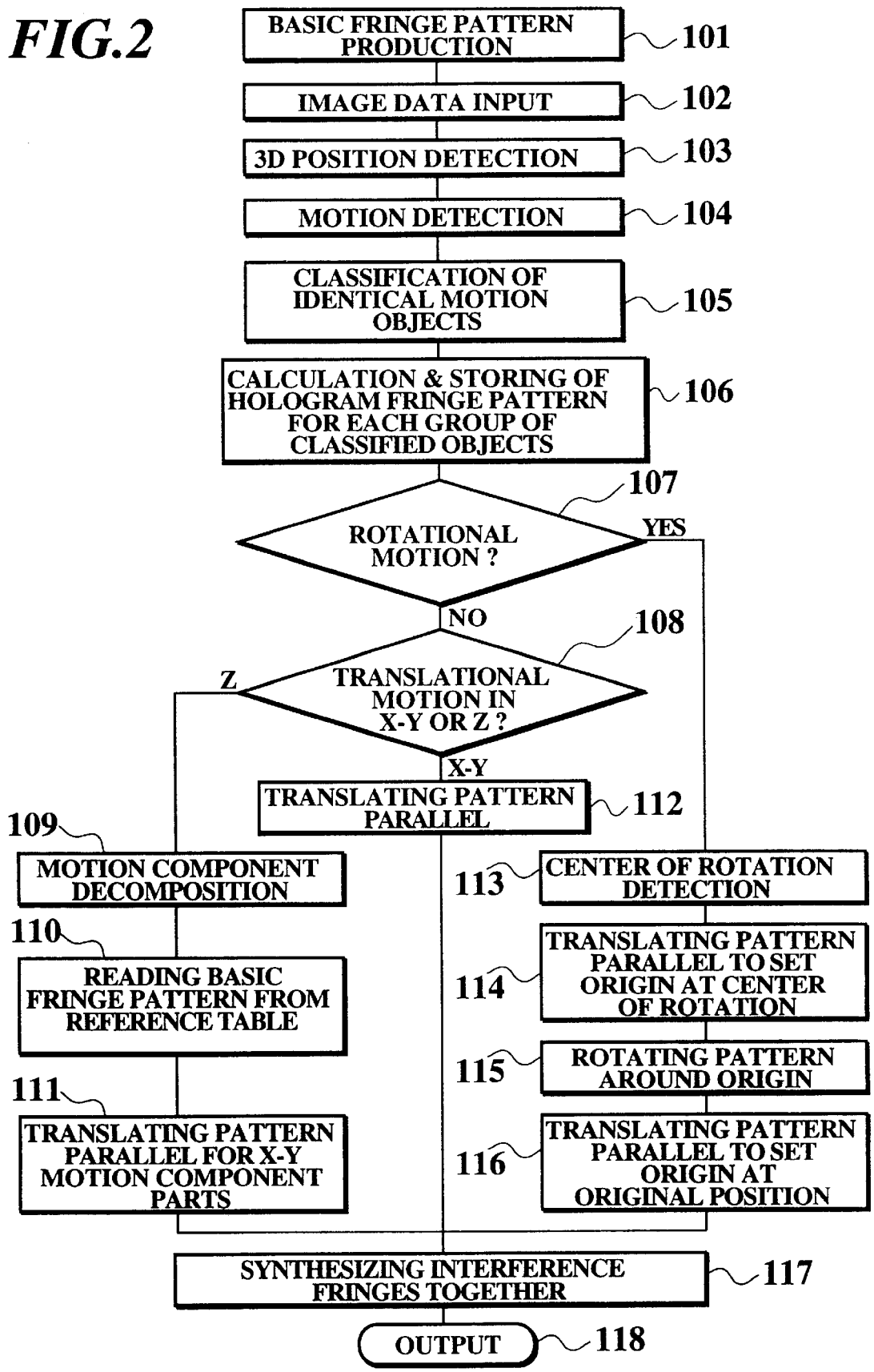
FIG. 2 is a flow chart of a procedure for computer generated hologram production operation according to the first embodiment of the present invention.
Figure 3:
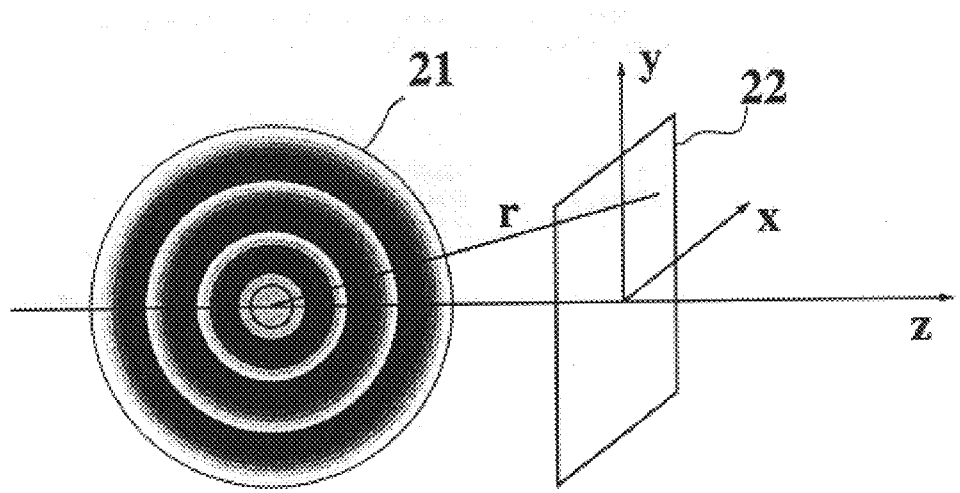
FIG. 3 is a schematic diagram showing a coordinates system used in describing the procedure of FIG. 2.

Now, a procedure for the computer generated hologram production operation according to this first embodiment will be described according to the flow chart of FIG. 2. Here, FIG. 3 shows a coordinates system used in the following description, with respect to a wavefront 21 in a form of a spherical wave and a hologram plane 22.

Figure 4:
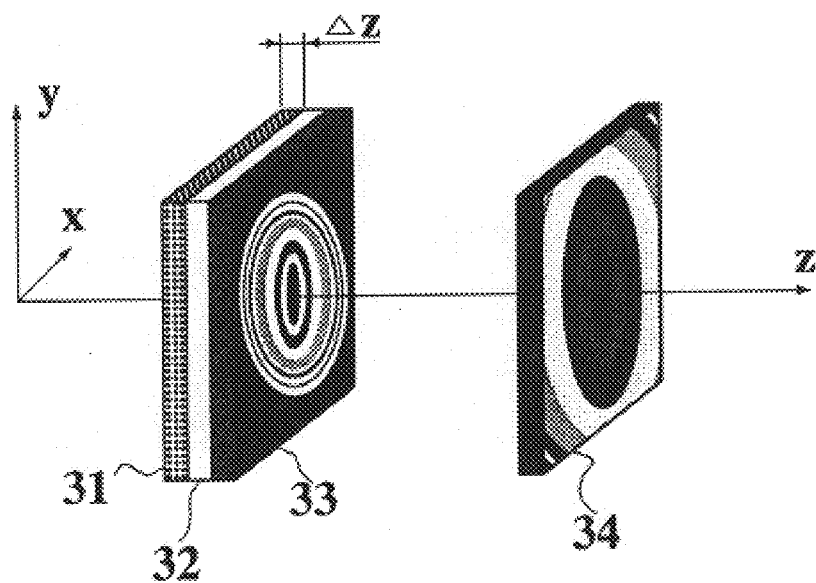
FIG. 4 is a schematic diagram showing basic fringe patterns used in the procedure of FIG. 2.

First, a table of basic fringe patterns for light in the z-axis direction is produced. Namely, as shown in FIG. 3, the wavefront 21 for a point light source is the spherical wave. Consequently, as shown in FIG. 4, the wavefront projection patterns 31 to 34 obtained by changing a value of z in Δz intervals are stored as basic fringe patterns in frame buffers to be used as a reference table (step 101).

Then, an image data of the objects are entered (step 102) and their three-dimensional positions are detected (step 103). and then their motions are detected by obtaining a motion vector for each object (point object) using inter-frame subtraction of the detected three- dimensional positions (step 104). Note here that the motion vector may be obtained by any other known processing such as optical flow processing or spatiotemporal image processing instead of using inter-frame subtraction.

Figure 5:
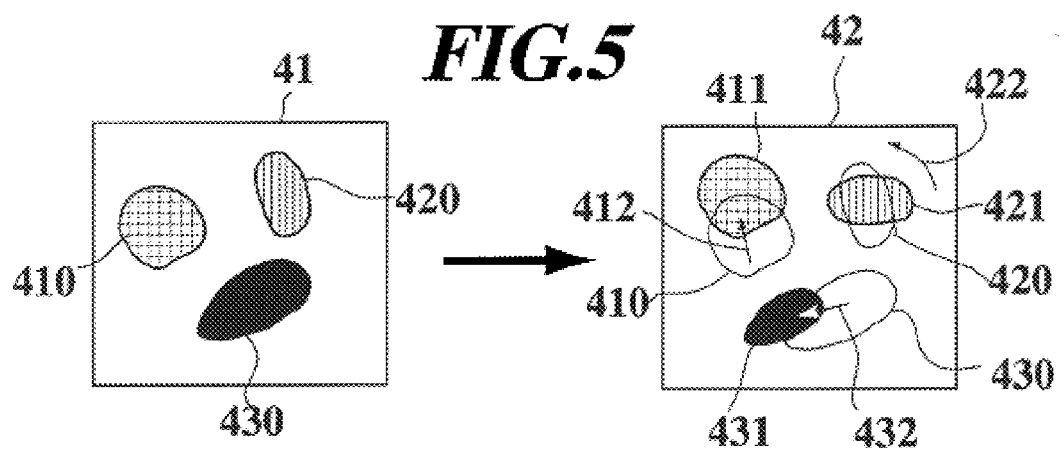
FIG. 5 is an illustration of exemplary objects and their motion vectors that are processed by the procedure of FIG. 2.

Next, each object is classified according to the orientation and the size of its motion vector so that the objects in the same motion are classified into the same class (step 105). For example, objects with exemplary motion vectors as shown in FIG. 5 can be classified as follows.

(a) objects in a translational motion $(x_a, y_a)$ on the x-y plane: an object 410 which is moved to 411 by a motion vector 412.

(b) objects in a rotational motion for θ around the coordinate $(x_\theta, y_\theta)$: an object 420 which is rotated into 421 by a motion vector 422.

(c) objects in a translational motion in the z-axis direction: an object 430 which is moved to 431 by a motion vector 432.

Figure 6:
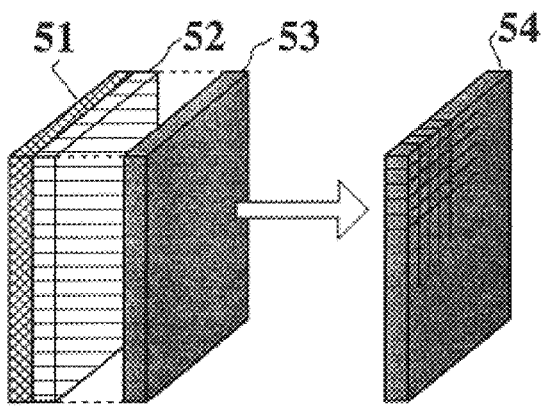
FIG. 6 is a schematic diagram showing frame buffers for separately storing hologram fringe patterns used in the procedure of FIG. 2.

Then, for each group of classified objects, the hologram fringe pattern (interference fringes) for a wavefront of light emitted from each object is produced from the basic fringe pattern, and the obtained hologram fringe patterns for different groups are stored into separate frame buffers 51–53 as shown in FIG. 6 (step 106). Note that FIG. 6 generally indicates that the hologram fringe patterns for objects in different motions are stored in the different frame buffers.

Next, the interference fringes for objects belonging to each class are processed according to their motion type as follows.

Figure 7:
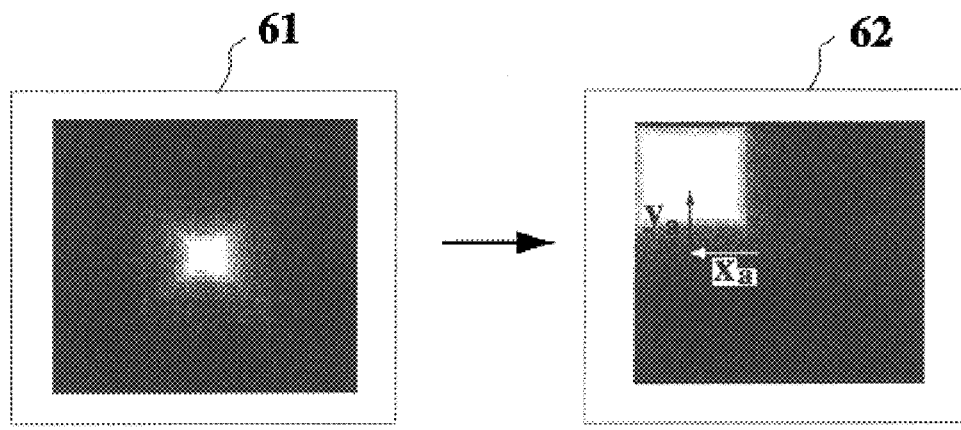
FIG. 7 is an illustration of a processing carried out on interference fringes for an object in a translational motion on the x-y plane according to the procedure of FIG. 2.

Namely, for the interference fringes for the objects classified as (a) (step 107 NO and step 108 x-y), as shown in FIG. 7 for a case of the motion vector for parallel translation, an original (previous) pattern 61 is translated parallel for $(x_a, y_a)$ to produce a pattern 62 (step 112).

Figure 8:
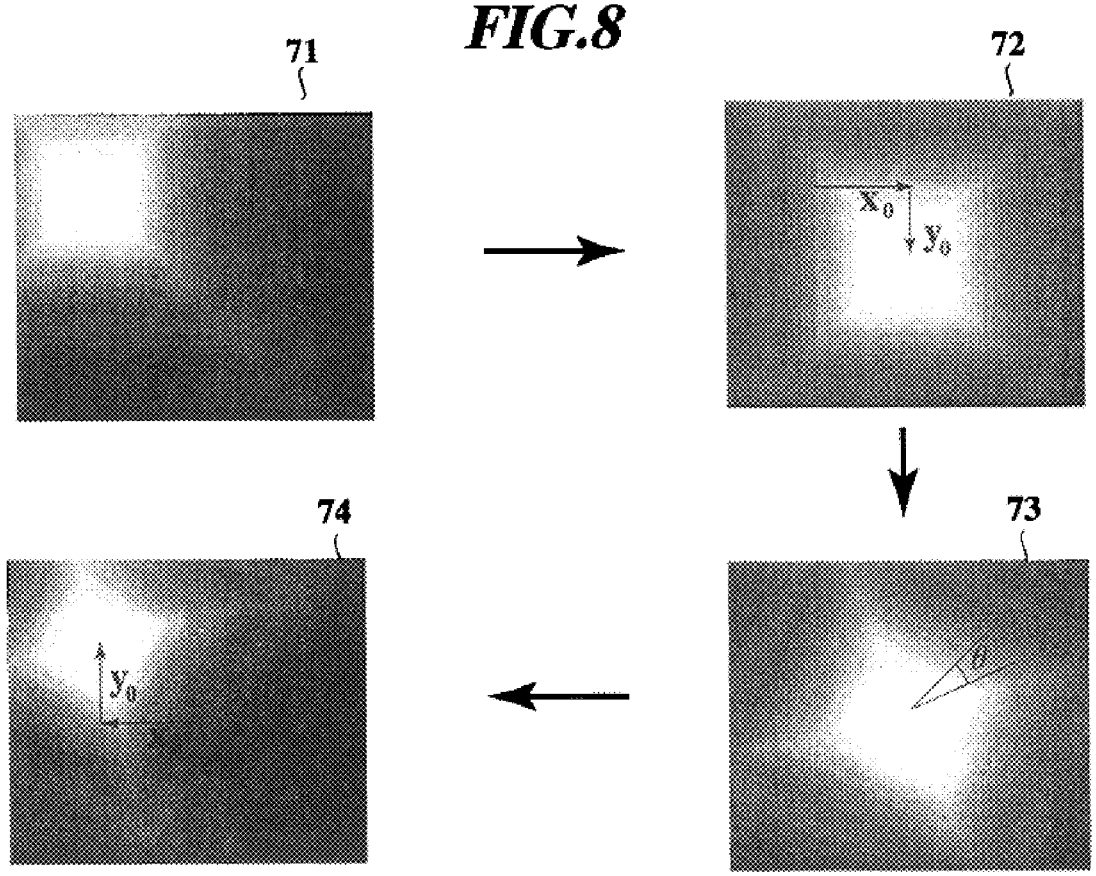
FIG. 8 is an illustration of a processing carried out on interference fringes for an object in a rotational motion according to the procedure of FIG. 2.

As for the interference fringes for the objects 10 classified as (b) (step 107 YES), a center of rotation is detected (step 113), and as shown in FIG. 8 for a case of the motion vector for rotation, an original (previous) pattern 71 is translated parallel for $(x_\theta, y_\theta)$ to produce a pattern 72 which has the origin set at the detected center of rotation (step 114). Then, the interference fringes are rotated for θ around the origin into the detected direction of rotation to obtain a pattern 73 (step 115). Then, the interference fringes are translated parallel again for $(-x_\theta, -y_\theta)$ to produce a pattern 74 which has the origin set at the original (previous) position (step 116).

Figure 9:
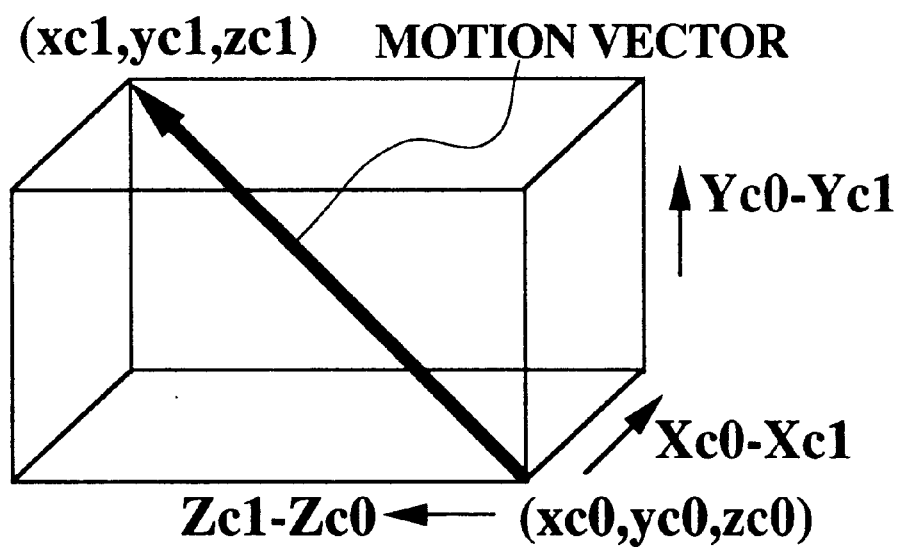
FIG. 9 is a schematic diagram showing a decomposition of a motion vector used in processing interference fringes for an object in a translation motion in the z-axis direction according to the procedure of FIG. 2.

As for the interference fringes for the objects classified as (c) (step 107 NO, step 108 z), the interference fringes are produced only from those objects which are classified as (c). Namely, suppose that there are N objects belonging to (c) and their positions are changed from $(x^i_{c0}, Y^i_{c}, z^i_{c})$ (i=1, . . . N) to $(x^i_{c1}, y^i_{c1}, z^i_{c1})$. Then, as shown in FIG. 9 for an exemplary motion vector, the motion vector of each object is decomposed into the translational components in the x-y directions and the translational component in the z-direction (step 109).

Then, the interference fringes are obtained first by assuming that each object $(x_\theta, y_\theta, z_\theta)$ is located at the origin, that is, the basic fringe pattern for $z=z_\theta$ is read out from the basic fringe patterns for a point light source which are produced in advance as the reference table (step 110). Then, the read out pattern is translated parallel for $(x^i_{c1}-x^i_{c0}, y^i_{c1}-y^i_{c0})$ (step 111). This processing is carried out for all the point objects i, and then the obtained interference fringes are summed together to produce a pattern for the motion of (c).

Finally, the interference fringes obtained for each of (a), (b) and (c) are synthesized together on a frame buffer 54 as indicated in FIG. 6, to produce the interference fringes after the object motion (step 117) and the produced pattern is outputted (step 118).

Now, with reference to FIG. 10, exemplary configuration and operation of a hologram production and display system in this first embodiment that has the above described features will be described.

Figure 10:
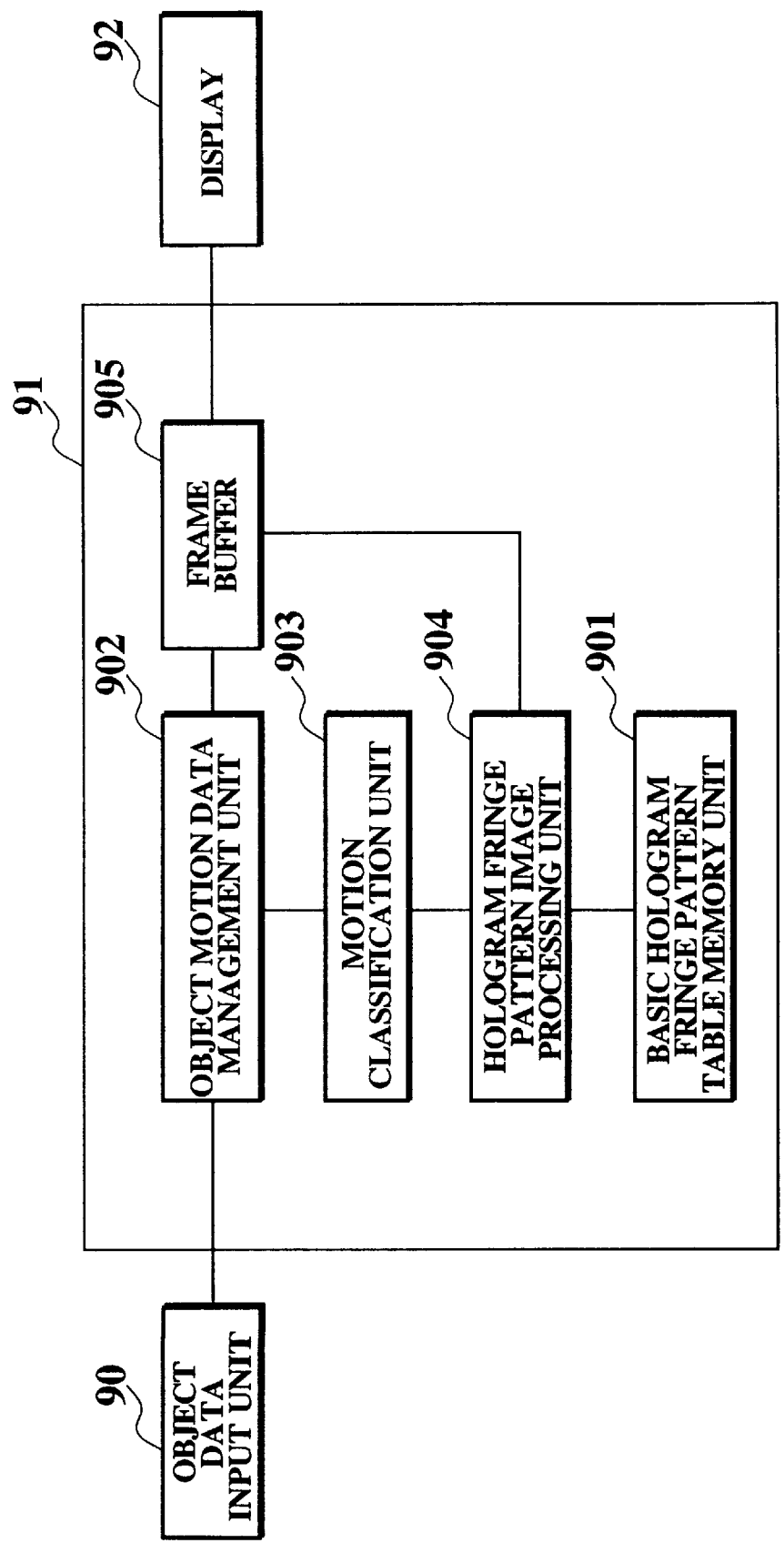
FIG. 10 is a block diagram of a hologram production and display system according to the first embodiment of the present invention.

The configuration of FIG. 10 comprises an object data input unit 90 for entering three-dimensional image of the object, a control unit 91 for controlling this system as a whole, and a display unit 92 for displaying the holograms, where the control unit 91 further comprises a basic hologram fringe pattern table memory unit 901 for storing the basic hologram fringe patterns, an object motion data management unit 902 for managing object position data and detecting object motions, a motion classification unit 903 for classifying object motions, a hologram fringe pattern image processing unit 904 for image processing the hologram fringe patterns themselves, and a frame buffer 905 for storing the hologram fringe patterns.

In this configuration of FIG. 10, the control unit 91 operates as follows.

The three-dimensional data entered from the object data input unit 90 are first given to the object motion data management unit 902, which recognizes and manages where each object has moved at At intervals and detects object motions. Then, the motion classification unit 903 classifies objects into groups of objects in the identical motion. Here, when a certain shape (a set of plural point objects) has moved in the same direction, these point objects are classified into one group. Then, the hologram fringe pattern image processing unit 904 produces the interference fringe patterns after Δt for each classified object. In other words, the new interference fringe pattern for each group after Δt is produced by obtaining a pattern at a time t=0 from the basic hologram fringe pattern table memory unit 901 and applying the translation or rotation processing to that pattern. The produced pattern is then stored in the frame buffer 905.

At the frame buffer 905, after the processing is finished for all the motion groups, all the values of the frame buffer 905 corresponding to all the motion groups are synthesized together, and the resulting pattern is outputted to the display unit 92. The outputted interference fringes represents the hologram of the target after Δt.

It is to be noted that the above described procedure is directed to a case of producing the reference table in advance for the case (c) of motion in the z-axis direction, but it is also possible to adopt the following alternative scheme for the case of motion in the z-axis direction.

Namely, the above equation (1) is exactly in a form of the convolution so that it can be rewritten using a symbol for the convolution operation as follows.

$$u(\xi,\eta)=g(\xi,\eta)*fz(\xi,\eta) \quad (6)$$

where $$fz(\xi,\eta)=1/(j\lambda z)\exp[jk\{z+(x^2+y^2)\}/2z] \quad (7)$$

Then, the both sides of the equation (6) can be Fourier transformed as follows.

$$F[u]=F[g]\,F[fz] \quad (8)$$

Using this equation (8), the interference fringes $u(\xi,\eta)$ can be obtained by first calculating the Fourier transform of f and g, and multiplying them together to obtain F[u], and then calculating the inverse Fourier transform of F[u].

Here, the function fz is equivalent to the binomial expansion approximation with a point light source at the origin, and this function is called a point light source transfer function which has a form not depending on shape/position of the object. In other words, the Fourier transform image of this point light source transfer function can be easily re-calculated as a function with a parameter z, or else it can be produce in advance as the reference table of volume as in the case (c) described above regardless of the shape of the display target.

This alternative scheme can be realized by either one of the following two exemplary procedures.

(a) A procedure for producing the reference table of the function fz in advance:

First, F[g] takes a value which is not related to the position change of the object in the z-axis direction, so that it can be calculated in advance by the hologram fringe pattern image processing unit 904 and stored as the reference table in the basic hologram fringe pattern table memory unit 901, at a timing where the display target is entered.

On the other hand, the values of F[f] obtained by changing z are calculated by the hologram fringe pattern image processing unit 904 before the display target input, and stored as the reference table in the basic hologram fringe pattern table memory unit 901. Then, for each pixel of the hologram, the hologram fringe pattern image processing unit 904 produces new interference fringes by obtaining F[u] by multiplying values of F[g] and F[f], and calculating the inverse Fourier transform of this F[u].

(b) A procedure for calculating the function fz each time:

When the motion in the depth direction is detected by the object motion data management unit 902, the hologram fringe pattern image processing unit 904 produces new interference patterns by re-calculating F[f] alone, multiplying this re-calculated F[f] with the already calculated F[g], and calculating the inverse Fourier transform of the resulting F[u].

It is to be noted that here the procedures (a) and (b) are described as separate procedures in the above, but it is also possible to use one of these (a) and (b) selectively for each object. For example, the procedure (b) can be selected for an object for which it is desirable to express minute object motions, and the procedure (a) can be selected for an object for which the object motion is not so important.

It is also to be noted that, in the above description, the parallel translation and rotation are used for the hologram fringe pattern image processing, but the types of image processing to be used here for the purpose of moving or deforming the display target object or shifting a view of the display target object due to camera operations are not necessarily limited to these, and the other types of image processing such as the pattern enlargement may be used as a suitable processing for changing the appearance of the target.

Also, in the above description, the image processing for an exemplary case of using the Fresnel transformation has been described for defining wavefront but, depending on the target, it is also possible to use the Fraunhofer transformation or the Fresnel Kirchhoff diffraction integral formula itself for defining wavefront.

As described, according to this first embodiment, when the same object moves within a specific plane, once the interference fringe pattern is calculated, it is possible to move or change the target object image by simply translating or rotating that pattern, so that there is no need to carry out calculations for each frame independently and therefore it becomes possible to realize the real time holographic video display. In addition, by utilizing the motion difference data and processing only moved portions, there is an advantage that the processing can be made faster.

Referring now to FIG. 11 to FIG. 15, the second embodiment of a method and a system for producing computer generated holograms according to the present invention will be described in detail.

In short, in this second embodiment, the entire display target are described at a plurality of resolution levels, and interference fringes on a hologram plane in a case of display in a coarse resolution level are calculated and displayed first. Then, at a time of hologram display, a direction of a line of gaze and a focal length of eyes of an observer are measured, and a gaze point target space is detected according to the measured focal length. Then, interference fringes in a case of display in a fine resolution level are re-calculated only for objects within the gaze point target space, and the re-calculated interference fringes and the already displayed interference fringes are synthesized and displayed.

For the hologram fringe pattern calculations, a required amount of calculations becomes enormous when a number of display target objects becomes numerous. However, a processing target of the calculations for changing holograms is not the entire display space region but only those located at specific distances within a space (view volume) corresponding to the viewed region, so that it is possible to reduce an amount of calculations considerably. In addition, by limiting a region of calculation for interference fringes in accordance with distances to target objects, it is possible to reduce an amount of calculations even further.

The human ability for identifying things by vision has a visual sense characteristic of high resolution and high sensitivity at a gaze point and a low sensitivity at peripheral portions. In this second embodiment, based on this visual sense characteristic, only those images which are to be displayed at the gaze point are displayed in high resolution, and the other images which are to be displayed at regions other than the gaze point are displayed in low resolution. The resulting displayed images fit well with the above described visual sense characteristic, so that it is possible to display images without causing any sense of physical disorder visually, while reducing a required amount of calculations for interference fringes to be displayed as described above.

Now, with references to the drawings, this second embodiment will be described in further detail.

Figure 11:
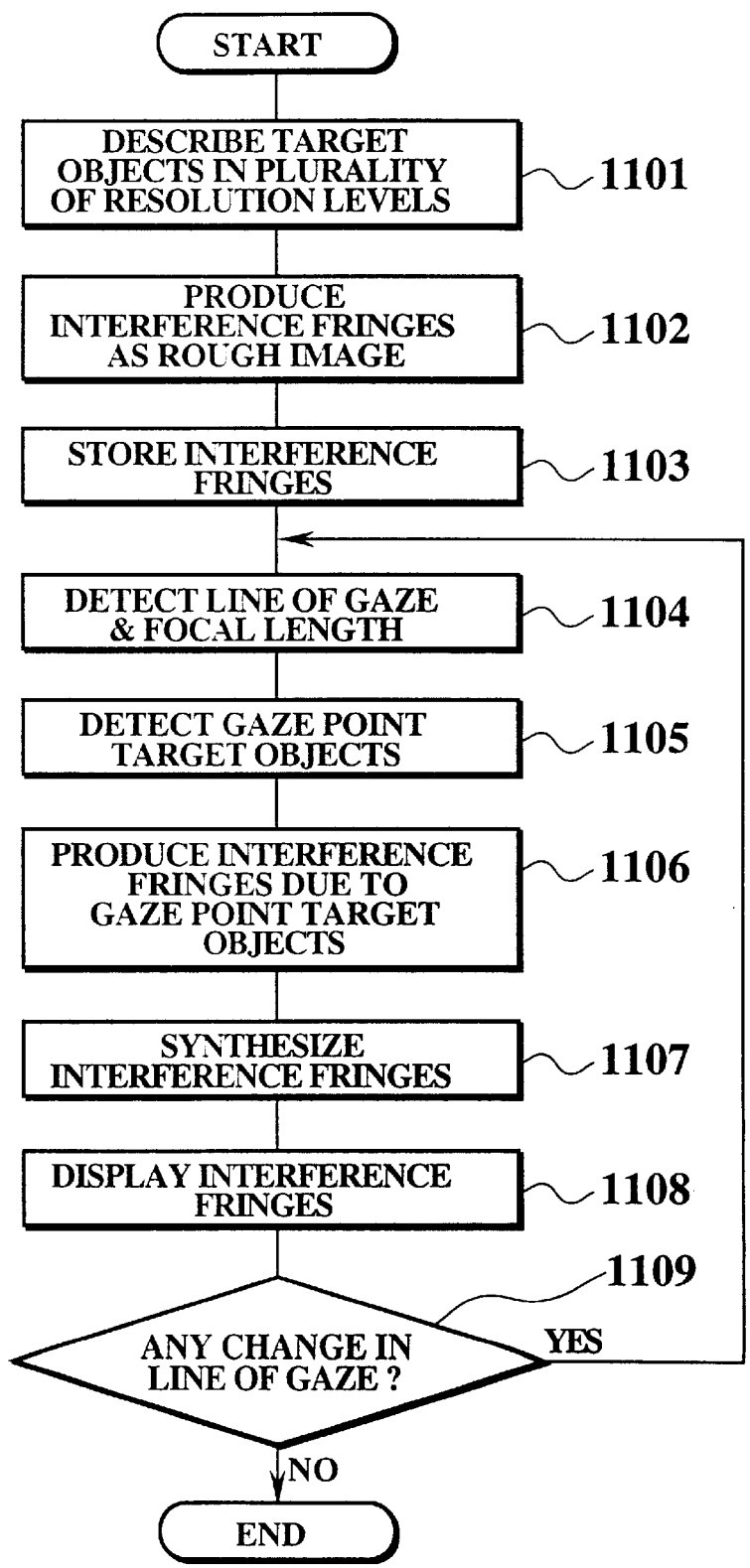
FIG. 11 is a flow chart of a hologram production and display procedure according to the second embodiment of the present invention.

FIG. 11 shows a flow chart for a hologram production and display procedure according to this second embodiment. Here, it is assumed that an object to be displayed is generated in a computer as a three-dimensional model (a set of point light sources, for example) in advance.

First, the entire display target object is described in a plurality (two in this example) of resolution levels (a low resolution level and a high resolution level in this example) (step 1101). Then, interference on a hologram plane in a case of display in the lower resolution level, that is, interference fringes as a rough image, are produced (step 1102). The calculated interference fringes are then stored (step 1103).

Next, a line of gaze and a focal length of eyes are detected (step 1104). Then, target objects located on the detected line of gaze are extracted as gaze point target objects (step 1105). Then, interference fringes due to wavefronts of lights from the extracted target objects are calculated from the high resolution level description data (step 1106).

Next, the interference fringes calculated at the step 1106 are synthesized with the earlier produced and already displayed interference fringes of the rough image (step 1107). Here, as the synthesis of interference fringes can be realized by storing interference fringes data as complex amplitude values and carrying out complex number calculations, for example. Then, only real part of the resulting complex amplitude is extracted and the resulting interference fringes are displayed (step 1108).

Thereafter, the above described steps 1104 to 1108 are repeated whenever there is a change in the line of gaze (step 1109).

Figure 12:
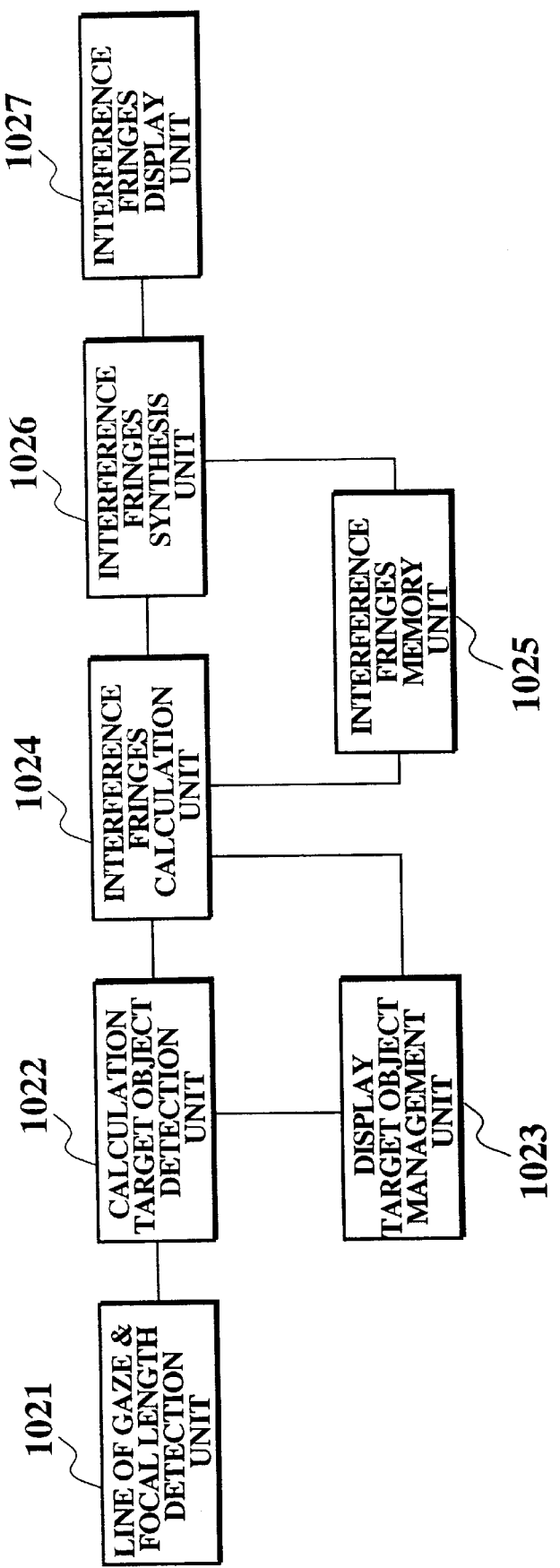
FIG. 12 is a block diagram of a hologram production and display system according to the second embodiment of the present invention.

FIG. 12 shows an exemplary configuration of a hologram production and display system in this second embodiment which has the above described features.

In this configuration of FIG. 12, the hologram production and display system comprises a line of gaze and focal length detection unit 1021, a calculation target object detection unit 1022, a display target object management unit 1023 for managing three-dimensional target objects, an interference fringes calculation unit 1024, an interference fringes memory unit 1025, an interference fringes synthesis unit 1026, and an interference fringes display unit 1027.

Here, it is assumed that the display target object management unit 1023 manages target objects in the display target space which are described in a plurality of resolution levels in advance. In this example, the low resolution level description data and the high resolution level description data are managed there.

First, the calculation target object detection unit 1022 specifies all the display target objects as the calculation target objects initially. Then, the interference fringes calculation unit 1024 reads out the low resolution level description data from the display target object management unit 1023 because all the display target objects are specified as the calculation target objects, and produces the interference fringes for the entire hologram screen. These interference fringes are then stored in the interference fringes memory unit 1025.

Figure 13:
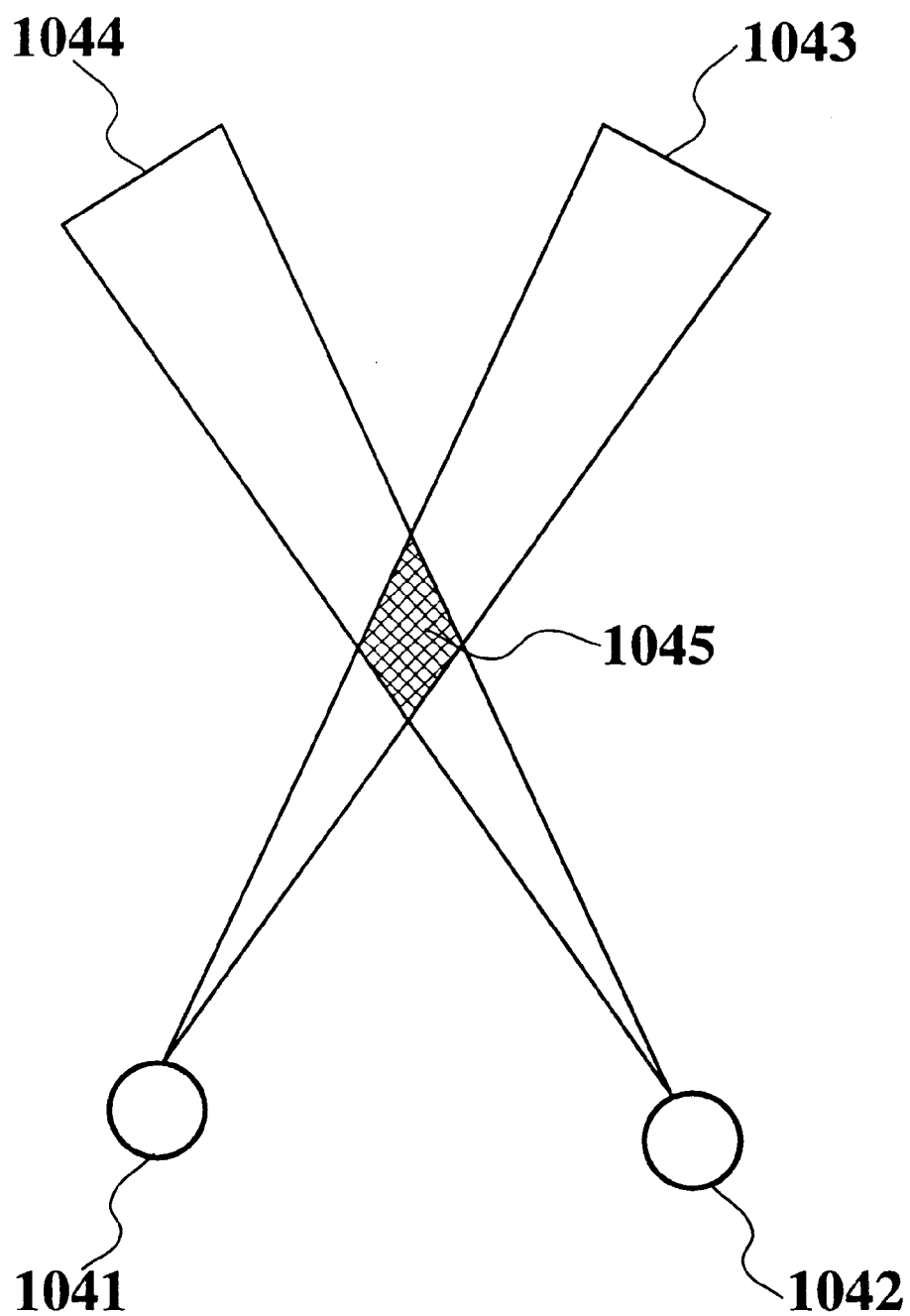
FIG. 13 is a schematic diagram showing an exemplary intersection region between directions of lines of gaze used in the second embodiment of the present invention.

Then, when the line of gaze and focal length detection unit 1021 detects a change in the line of gaze, an intersection region between directions of lines of gaze by both eyes is calculated and the focal length (depth) of the eyes is calculated. FIG. 13 shows an exemplary intersection region between directions of lines of gaze from which the focal length (depth) of the eyes can be calculated. Namely, in this case, along the lines of gaze from a left eye 1041 and a right eye 1042, respective view volumes 1043 and 1044 are calculated. Then, a position of an intersection region 1045 between these two view volumes 1043 and 1044 can be used in determining the focal length. Note that this method for obtaining the focal length is only an example, and it is equally possible to use any other method that can measure the focal length of eyes.

Then, from the calculated focal point position (a gaze point position), the gaze point target objects are detected. Here, those objects which are located in a space of the intersection region 1045 shown in FIG. 13 are to be detected as the gaze point target objects.

Then, for the detected gaze point target objects, the interference fringes calculation unit 1024 reads out the high resolution level description data from the display target object management unit 1023 and calculates interference fringes according to these high resolution level description data.

Then, the interference fringes synthesis unit 1026 synthesizes these newly calculated interference fringes with the already existing coarse interference fringes read out from the interference fringes memory unit 1025, so as to produce new interference fringes.

The new interference fringes are then sent to the innterference fringes display unit 1027 and displayed there as a hologram.

Thereafter, the above described process is repeated according to the change in the line of gaze.

By the configuration and processing as described above, it is possible to reduce an amount of calculations for interference fringes, while realizing the realistic hologram display (with a large display space) using the high resolution hologram data.

It is to be noted that the above description is directed to an exemplary case of using two description levels, but it is also possible to use any desired number of description levels depending on distances to the hologram plane.

It is also possible to modify this second embodiment by adopting either (a) a scheme that uses only one object description level but changes hologram resolution level, or (b) a scheme that calculates interference fringes only for a part of the hologram. The fact that the similar image can be displayed by using only a part of the hologram rather than the entire hologram has been demonstrated both theoretically and experimentally (see C. B. Burckhardt "Information Reduction in Holograms for Visual Display", J. Opt. Soc. Am., Vol. 58, No. 2, pp. 241–246, 1968).

In the former scheme (a) for changing the hologram resolution level, suppose that the hologram resolution level is given by the resolution level of 1000×1000 pixels. In such a case, interference fringes are calculated in the resolution level of 1000×1000 for the gaze point target objects while the hologram of the same size is calculated in the resolution level of 500×500 for the other objects outside the gaze point, for example.

As a concrete example, consider a case of using a display target space 1053 as shown in FIG. 14. In such a case, it is possible to use the processing where interference fringes for the gaze point target objects are calculated from all pixel values in an entire hologram 1054 are calculated, while interference fringes for the other objects outside the gaze point are calculated from only one of every two adjacent pixels as indicated by 1051, for example. Alternatively, it is also possible to classify the other objects outside the gaze point into a plurality of groups, such as two groups A and B, and interference fringes are calculated from only one of every two adjacent pixels for the group A while interference fringes are calculated from another one of every two adjacent pixels for the group B as indicated by 1052.

On the other hand, in the latter scheme (b) for utilizing only a part of the hologram, as shown in FIG. 15, a display target space 1055 as well as a hologram 1056 are divided into left and right halves A and B, for example. Then, interference fringes for objects located on the right half of the display target space 1055 are calculated only on the right half of the hologram 1056, while interference fringes for objects located on the left half of the display target space 1055 are calculated only on the left half of the hologram 1056. In this manner, a calculation region can be reduced to a half and therefore an an amount of calculations can also be reduced to a half.

Note that it is not absolutely necessary to divide the display target space 1055 and the hologram 1056 into right and left halves as described above, and in general, it is possible to divide the hologram into a plurality of regions and set up appropriate display target space portions in correspondence to these partial hologram regions so as to change the calculation region according to the need.

Note also that the scheme (a) and the scheme (b) are described separately in the above, but it is also possible to used them in combination, in which it becomes possible to realize the further reduction of an amount of calculations.

It is also to be noted that this second embodiment is applicable as long as it is possible to switch the screen display in synchronization with the line of gaze detection. For example, it is also possible to provide a plurality of line of gaze detection devices on a large screen display device, and provides the high resolution display at a plurality of portions corresponding to a plurality of lines of gaze. Thus this second embodiment is not limited by a form of a display device to be used.

It is also to be noted that the above description is directed to an exemplary case of using intersection of lines of gaze as the gaze point and re-calculating those portions corresponding to the gaze point by using high resolution data, according to the gaze point position, but this second embodiment is not limited by a method for detecting the gaze point position. For example, it is also possible to measure the gaze point position from a level of tension of ciliary body muscles (i.e. a change of thickness of crystalline lens) that function to adjust the eyes. Moreover, in such a case, it is also possible to judge whether the observer is paying attention or not from a deviation between a position of intersection of lines of gaze and the focal point position, and the calculations for the high resolution display are carried out only when it is judged that the observer is paying attention. This is because a coarse resolution level of images not consciously seen by the eyes would hardly affect the observer at all.

It is also possible to adopt a scheme in which the high resolution display is not to be carried out for objects located farther away, such as those located at several tens of meters (at most about 20 meters), even if they are located at the gaze point position. This is because it is generally said that the human visual function can only perceive the depth up to about 20 meters due to congestion.

As described, according to this second embodiment, even when the display target space is large, the interference fringes calculation target space for the purpose of display is limited only to the gaze point, so that it becomes possible to realize the hologram display with a reduced amount of calculations. The high resolution hologram display is used for the gaze point while the coarse hologram display is used for regions other than the gaze point, so that it is possible to realize the hologram display that fits with the human visual sense characteristic, without causing any sense of physical disorder to the observer.

Referring now to FIG. 16 to FIG. 23, the third embodiment of a method and a system for producing computer generated holograms according to the present invention will be described in detail.

In short, in this third embodiment, position information of target objects is managed and a region of calculations for interference fringes are limited by changing in proportion to a distance from each target object to a hologram plane, for example, so that interference fringes are calculated only within such a limited region. Then, when some target object is moving, interference fringes are re-calculated similarly only for such a target object which is moving, and then synthesized with the already displayed interference fringes to produce a new hologram to be displayed. Also, for those objects which are located at distances greater than a certain threshold from the hologram plane, a region of calculations and a scheme of calculations are changed in such a manner that interference fringes are calculated collectively as images projected onto a plane, for example.

In this third embodiment, a region of calculations is limited according to a distance between an object and the hologram plane, so that an amount of calculations does not depend on an area of the hologram display screen. In addition, near distanced objects require more amount of data than far distanced objects for their description (e.g. when an object is to be described by a set of point light sources, a greater number of point light sources will be required for a nearer distanced objects), but when there are many near distanced objects, it implies that there are many objects for which a region of calculations is small, so that an overall amount of calculations can be kept small. As for the far distanced objects, a region of calculations is going to be large, but an amount of data required for calculations is small, so that an overall amount of calculations can also be kept small.

Furthermore, those objects which are located farther than some distance are described collectively as two- dimensional images by adopting a calculation scheme utilizing the Fourier transform, for example, so that a required amount of calculations can be reduced considerably compared with a case of calculating wavefronts for individual data.

At this point, with references to FIG. 16 to FIG. 18, the reason why a limited region of calculations does not severely affect an image quality of reconstructed images in this third embodiment will be described.

Figure 17:
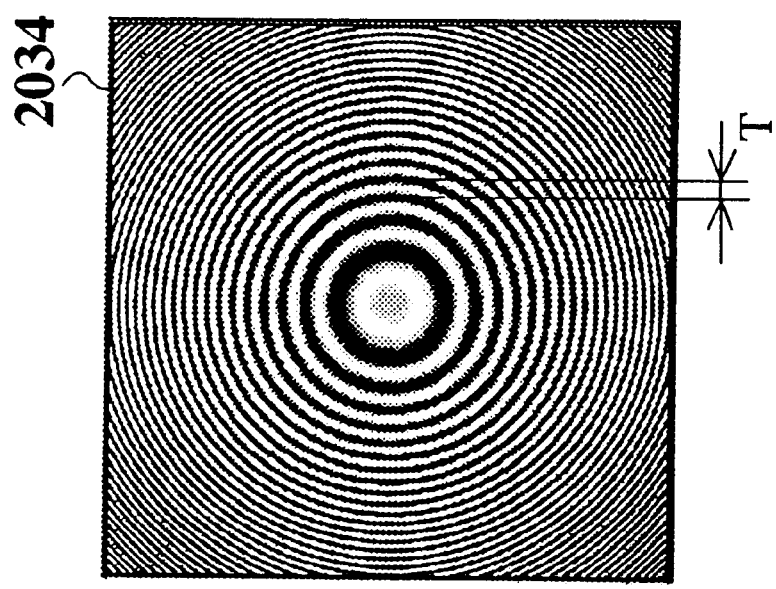
FIG. 17 is an illustration of a fringe pattern produced by the wavefront of FIG. 16.
Figure 16:
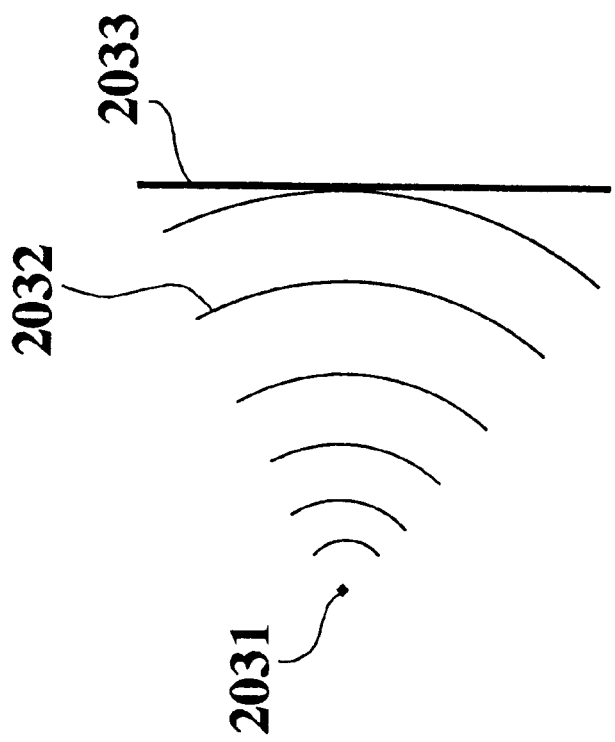
FIG. 16 is a schematic diagram showing a wavefront generated by a point light source used in the third embodiment of the present invention.
Figure 18:
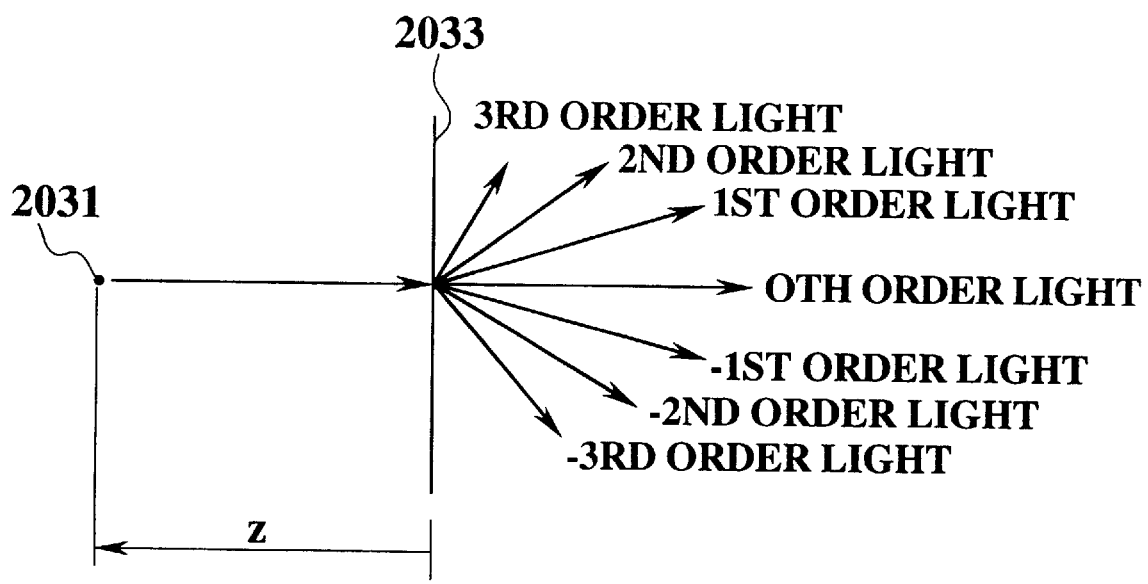
FIG. 18 is a schematic diagram showing diffracted lights at a projection plane originating from a point light source used in the third embodiment of the present invention.

Namely, as shown in FIG. 16, when an object is regarded as a point light source 2031, a wavefront generated by this point light source 2031 on a projection plane 2033 is going to be a spherical wave 2032, so that it produces a fringe pattern 2034 in a form of concentric circles as shown in FIG. 17, just like Fresnel lens. Then, the light that passes through this fringe pattern 2034, that is the light that passed through the projection plane 2033 at each point, will be propagated by being diffracted into a plurality of directions, as the 0th order light, ±1st order light, ±2nd order light, ±3rd order light and so on, as shown in FIG. 18. Then, these plurality of diffracted lights that pass through different positions on the hologram will interfere with each other so that high light intensity portions appear at portions corresponding to a distance at which the object is located. These intensity variations of the interfered lights are then projected onto the retina as an image.

Now, the intensity of the diffracted light rapidly decreases as the order of the diffracted light increases, so that the intensity of the higher order diffracted light is only several % or less of the intensity of the 0th order light and therefore it is practically negligible. In other words, the lights that passes through outer concentric circles have very little contributions to the image formation, and therefore interference fringe calculations for them can be omitted.

However, a region of calculations cannot be fixedly set up for the following reason. Namely, depending on a distance z between the point light source 2031 and the projection plane 2033 as indicated in FIG. 18, intervals between interference fringes for the diffracted lights become wider as the distance becomes farther away from the Fresnel region to the Fraunhofer region. Here, an interval between interference fringes means an interval T between adjacent dark fringes as indicated in FIG. 17, for example. For the constant area, the less fringes for generating higher order diffracted lights are displayed for the farther distanced object, so that it becomes increasingly difficult to produce a clear image for the farther distanced object. In other words, in order to converge lights into a single point, the farther distanced object requires interference fringes in the larger area.

For this reason, by enlarging/contracting a region of calculations according to increase/decrease of a distance up to the object projection plane, it becomes possible to calculate only those portions of interference fringes which are generated by lights necessary for the image formation, and therefore it becomes possible to reduce an overall amount of calculations.

Now, with references to the drawings, this third embodiment will be described in further detail.

Figure 19:
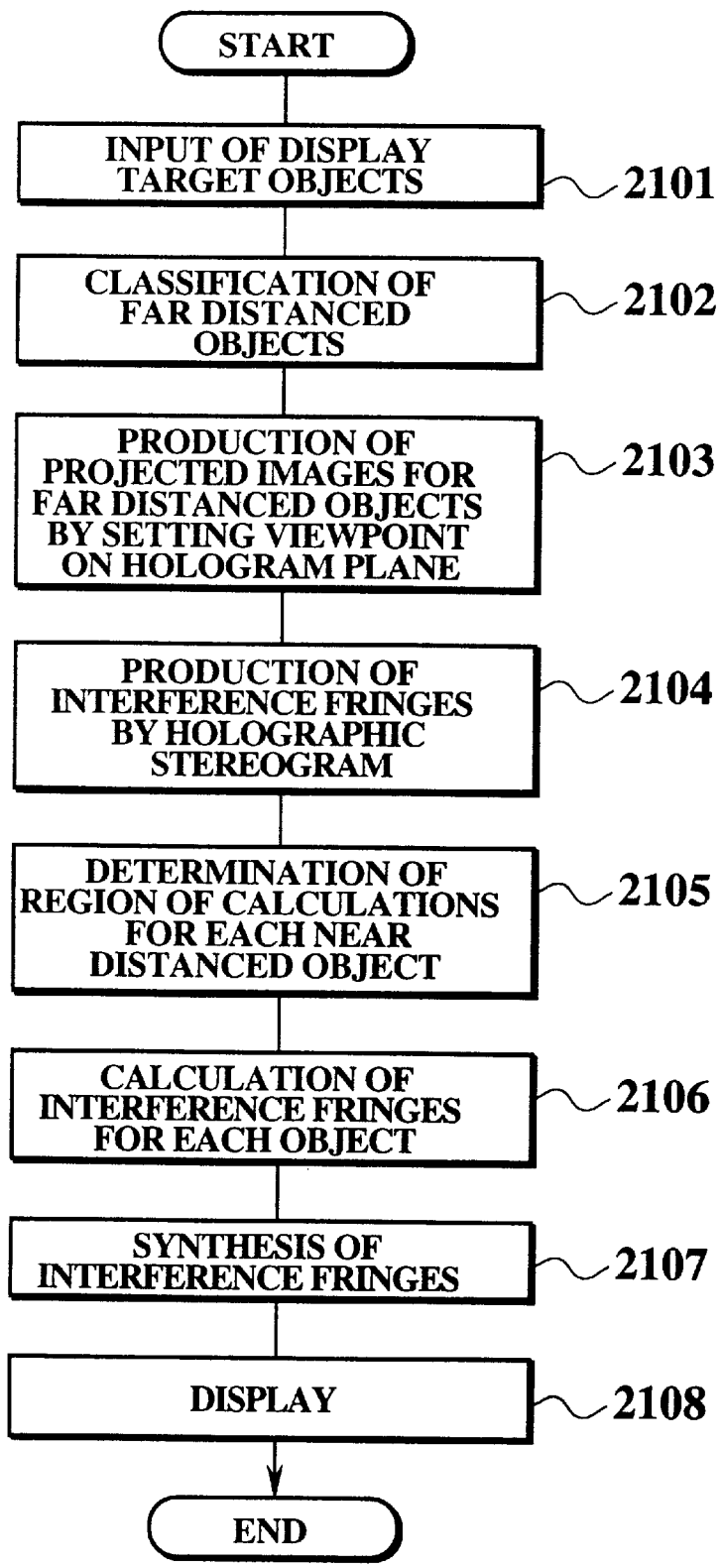
FIG. 19 is a flow chart of a hologram production and display procedure according to the third embodiment of the present invention.
Figure 20:
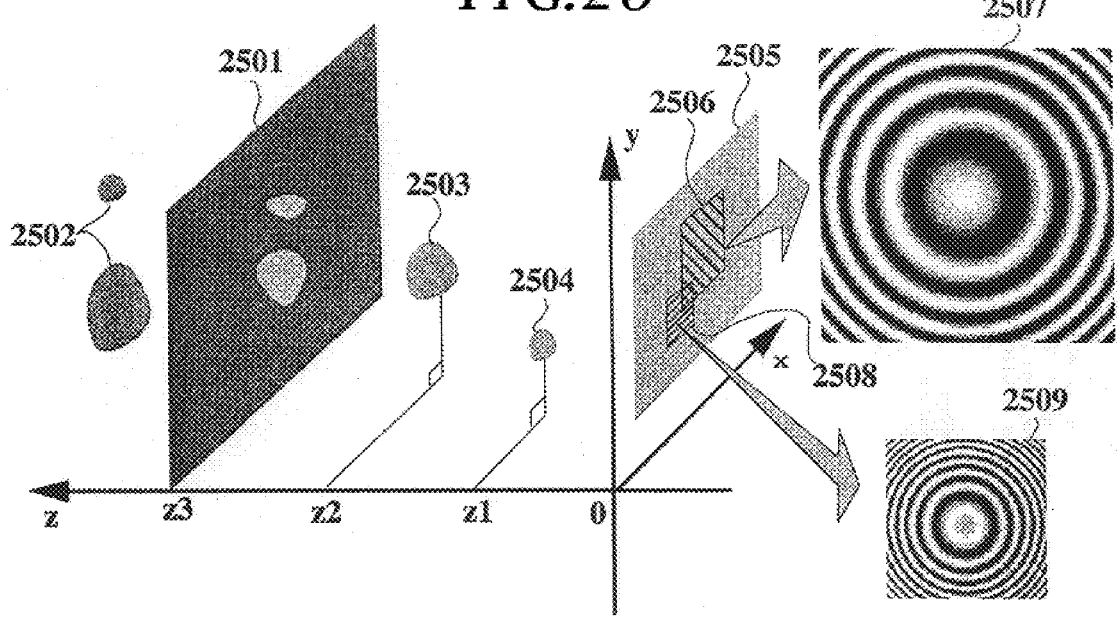
FIG. 20 is a schematic diagram showing a display target space and its coordinates system used in the procedure of FIG. 19.

FIG. 19 shows a flow chart for a hologram production and display procedure according to this third embodiment, while FIG. 20 shows a display target space and its coordinates system used in the following description. In this third embodiment, a threshold distance for separating far distanced objects is assumed to be z3.

First, three-dimensional models of display target objects to be displayed as a hologram are entered into a computer (step 2101), and those target objects for which a distance up to the hologram plane is not less than the threshold z3 are classified as far distanced objects according to positions of individual display target three-dimensional models (step 2102). Then, for the classified far distanced objects, projected images are produced by setting a viewpoint on the hologram plane and placing a projection plane perpendicular to the z-axis (step 2103). In FIG. 20, objects 2502 are the far distanced objects located at distances greater than the threshold z3, and for these objects 2502, two-dimensional Images are produced as the projected images on a projection plane 2501. Then, interference fringes are calculated by the method of holographic stereogram (step 2104).

Next, for each object for which a distance up to the hologram plane is less than the threshold z3 (such as objects 2503 and 2504 shown in FIG. 20), a region of calculations for interference fringes due to each object is determined in terms of a radius R of this region as a function of a distance z from each object to the hologram plane and an initial value R0 of the radius R, that is, as given by the following formula (9) (step 2105).

$$R = f(R0, z) \quad (9)$$

For example, a function in which the radius R is proportional to the distance z as given by the following formula (10) can be used here.

$$R = z \quad (10)$$

In FIG. 20, light from the object 2503 produces an interference fringe pattern 2507 on the hologram plane 2505, while light from the object 2504 produces an interference fringe pattern 2509 on the hologram plane 2505.

Figure 21:
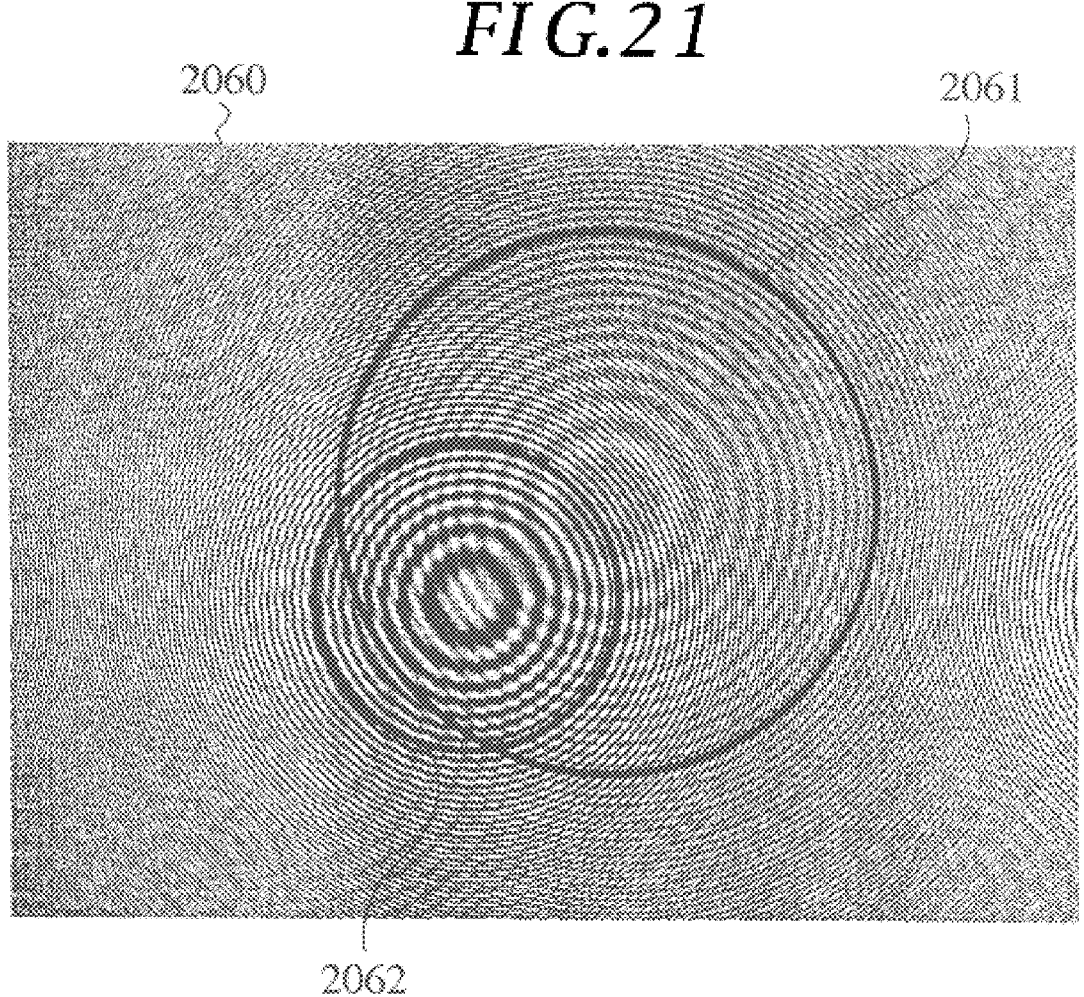
FIG. 21 is an illustration of exemplary interference fringes obtained by the procedure of FIG. 19.

Then, for each object, interference fringes of light are calculated within a specific region according to a distance between the object and the hologram plane (step 2106). FIG. 21 shows exemplary interference fringes obtained by using a limited region of calculations for interference fringes. In FIG. 21, a region 2061 indicates a region of calculations for interference fringes due to the object 2503 while a region 2602 indicates a region of calculations for interference fringes due to the object 2504.

Then, all the interference fringes due to all the objects are synthesized (step S2107) so as to produce the interference fringes 2060 as shown in FIG. 21, and these interference fringes 2060 are displayed as the hologram (step 2108).

Figure 22:
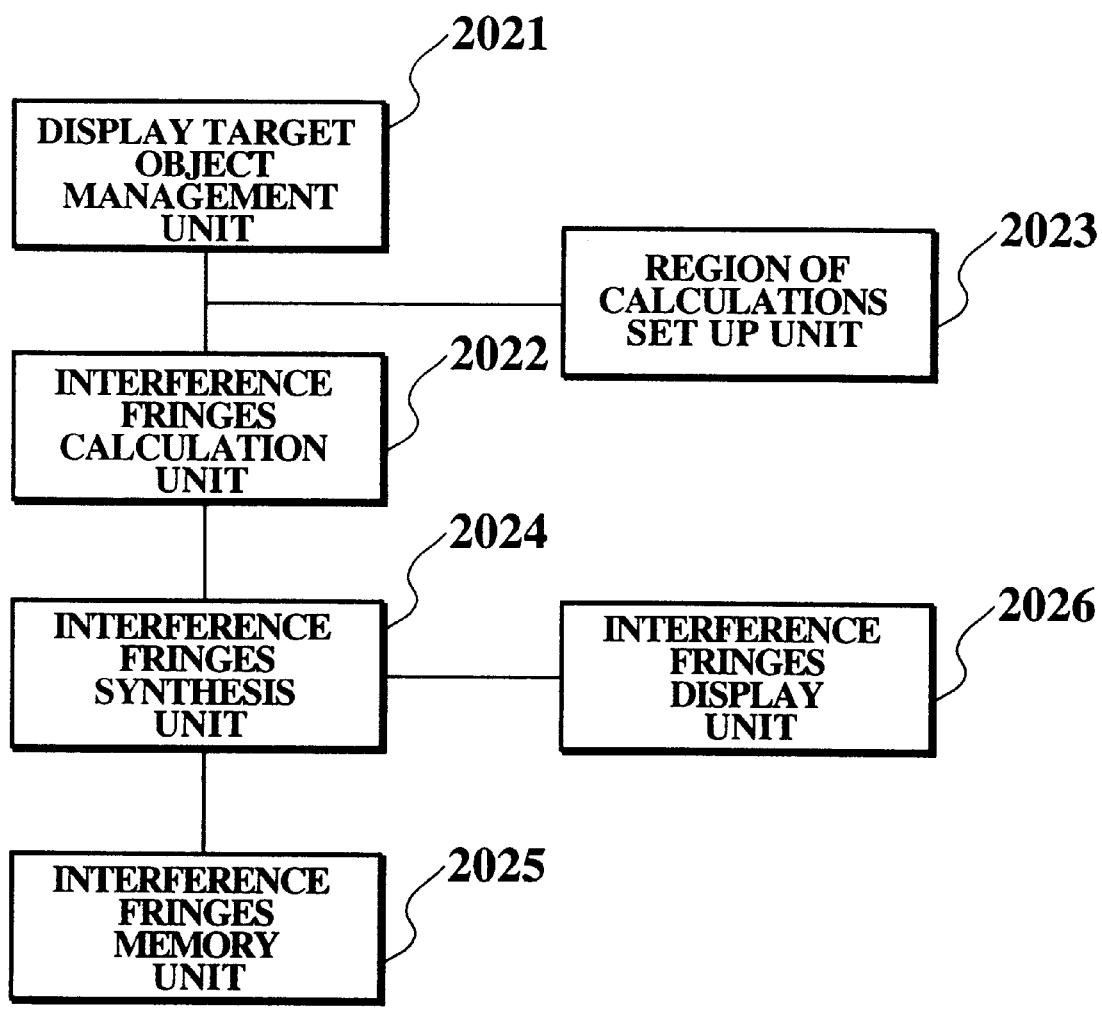
FIG. 22 is a block diagram of a hologram production and display system according to the third embodiment of the present invention.

FIG. 22 shows an exemplary configuration of a hologram production and display system in this third embodiment which has the above described features.

In this configuration of FIG. 22, the hologram production and display system comprises a display target object management unit 2021 for managing positions of the display target objects, an interference fringes calculation unit 2022, a region of calculations set up unit 2023 for setting up a region of calculations for interference fringes, an interference fringes synthesis unit 2024, an interference fringes memory unit 2025, and an interference fringes display unit 2026. Here, the display target object models can be stored either in the display target object management unit 2021 or in a separate storage unit not shown in FIG. 22.

This hologram production and display system of FIG. 22 operates as follows.

First, the objects to be displayed are entered into the display target object management unit 2021, and then read out according to the distance z between each object and the hologram plane. Then, the interference fringes calculation unit 2022 classifies the display target objects according to their distances. For the far distanced objects, a projected image production function provided in the interference fringes calculation unit 2022 produces two-dimensional projected images, and an interference fringes production function provided in the interference fringes calculation unit 2022 calculates interference fringes as the Fourier transform type hologram. For the near distanced objects, the region of calculations set up unit 2023 determines a region of calculations for interference fringes according to the distances, and the interference fringes calculation unit 2022 calculates interference fringes for each object within the set up region of calculations.

Then, the interference fringes synthesis unit 2024 synthesizes interference fringes obtained for each near distanced objects as well as interference fringes obtained by the holographic stereogram for the far distanced objects, to produce interference fringes to be displayed as the hologram, which are stored in the interference fringes memory unit 2025 and displayed by the interference fringes display unit 2026.

In this hologram production and display system of FIG. 22, objects near the hologram plane have smaller regions of calculations so that the calculations can be carried out at high speed, without depending on an area of the hologram display screen, and therefore the calculation time can be shortened.

It is to be noted that the above description is directed to an exemplary case of setting a region of calculations for interference fringes in a shape of a circle, but it is possible to use any other desired shape such as an ellipse, rectangle, etc. This setting can be freely changed according to various factors such as a simplicity of calculations, a speed of calculations, shapes of objects, types of light sources (point light source, line light source, plane light source, etc.), and distances between objects and the hologram plane. Thus this third embodiment is not limited by a shape of calculation region to be used.

Also, the above description is directed to a case of expressing each object as a set of point light sources and using a spherical wave, but a method for describing each object can be any method which can describe interferences of lights. Thus this third embodiment is not limited by a method for describing objects either.

Also, the above description is directed to a case where objects are stationary, but this third embodiment can be easily applied to a case of video images.

Figure 23:
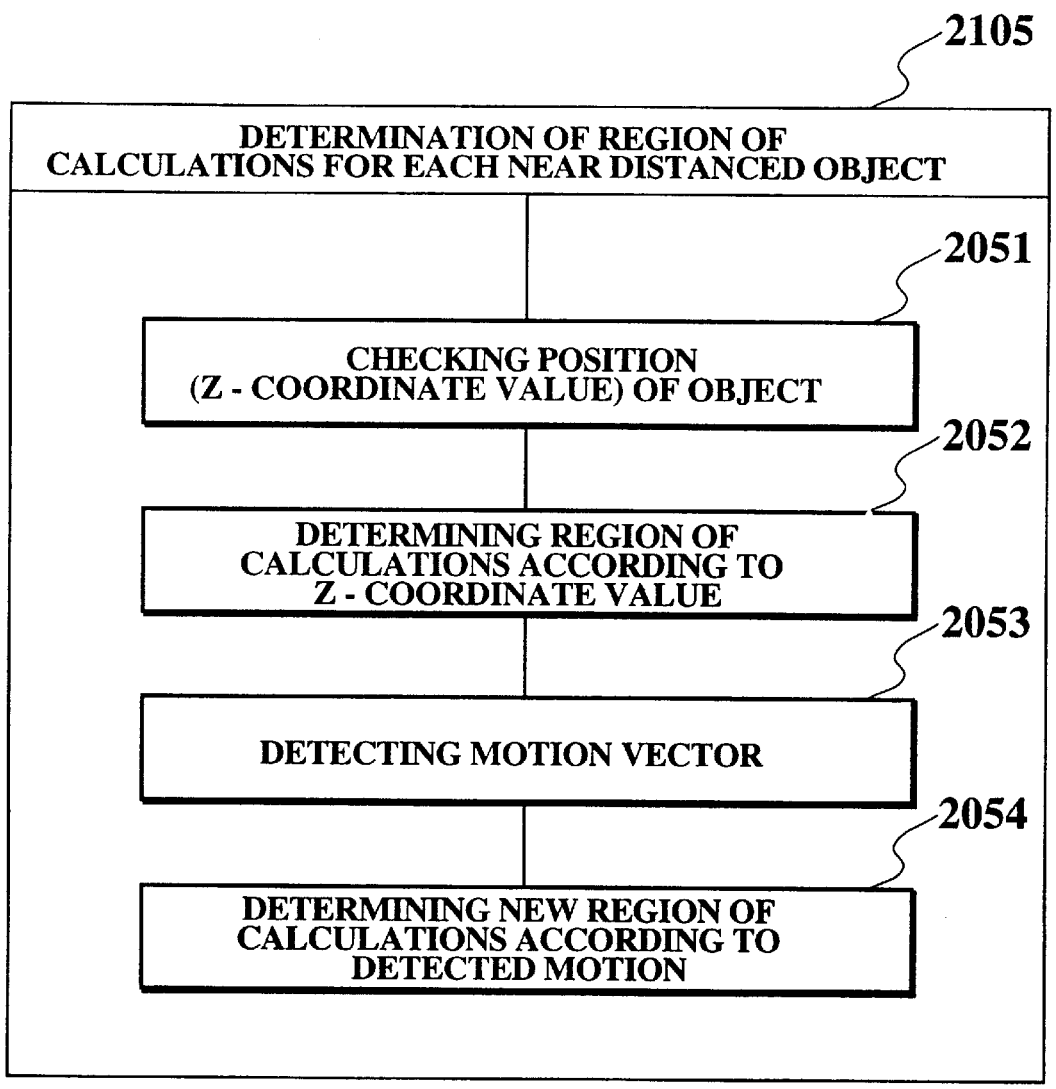
FIG. 23 is a flow chart of a detailed procedure at the step 2105 of FIG. 19 in a case of producing holographic video images.

Namely, in such a case, the step 2105 of FIG. 19 can be carried out by the detailed procedure as shown in FIG. 23. First, the position (z-coordinate value) of the object is checked (step 2051) and a region of calculations is determined according to the z-coordinate value of the object (step 2052). Then, the display target object management unit 2021 detects whether the object has moved or not by detecting a motion vector (step 2053). Then, the region of calculations set up unit 2023 limits the region of calculations according to a quantity (speed) of the detected motion (step 2054).

For example, when the region of calculations for the object moving at a speed v is given by R1, a new region of calculations can be given by the following formula (11).

$$R = g(R1, v) \quad (11)$$

As a concrete example, when the new region of calculations is given by the following formula (12):

$$R = R1/v \quad (12)$$

the region of calculations becomes smaller for the object moving faster or larger for the object moving slower. For the same distance up to the hologram plane, the clearer image can be displayed by the larger region of calculations, and therefore the faster moving object will be displayed to be somewhat blurred.

After that, interference fringes are produced by the same procedure as described above only for those moved objects, and then the produced interference fringes for these moved objects are synthesized with the already displayed interference fringes to form a next frame. Thus, even when the processing target is video, it is possible to produce and display interference fringes at high speed.

As described, according to this third embodiment, the region of calculations becomes smaller for objects near the hologram plane or larger for objects far from the hologram plane. Since the near distanced objects require more detailed display and therefore more data, this limiting of the region of calculations is effective in improving the calculation speed. On the other hand, the far distanced objects generally have little changes so that when the interference fringes for them are calculated in advance the subsequent calculations are hardly necessary and it is still possible to produce the realistic hologram display.

Moreover, by changing a method for calculating interference fringes as well as the region of calculations according to the distance between objects and the hologram plane, as in a case of using a method for collectively calculating interference fringes for those objects which are located farther than the threshold by using their projected images, it is possible to reduce an amount of calculations and improve the calculation speed further.

Furthermore, by detecting moving objects, calculating interference fringes for the moving objects by limiting the region of calculations similarly, and synthesizing them with the already displayed interference fringes, it becomes possible to realize the high speed holographic video display.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing computer generated holograms of a plurality of display target objects arranged at different positions along a depth direction, comprising the steps of:

obtaining a distance between each display target object and a hologram plane;

limiting a region of calculations for interference fringes due to each display target object according to the distance obtained by the obtaining step;

separately calculating interference fringes due to each display target object within the region of calculations as limited by the limiting step; and producing a hologram to be displayed, by synthesizing separately calculated interference fringes due to all display target objects.

2. A method for producing computer generated holograms of a plurality of display target objects arranged at different positions along a depth direction and including near distanced display target objects and far distanced display target objects, comprising the steps of:

obtaining a distance between each display target object and a hologram plane;

limiting a region of calculations for interference fringes due to each near distanced display target object for which the distance obtained by the obtaining step is not greater than a prescribed threshold;

separately calculating interference fringes due to each near distanced display target object within the region of calculations as limited by the limiting step;

collectively calculating interference fringes as a projected image due to far distanced display target objects for which the distance obtained by the obtaining step is greater than the prescribed threshold; and producing a hologram to be displayed, by synthesizing interference fringes calculated by the separately calculating step and interference fringes calculated by the collectively calculating step.

3. A method for producing computer generated holograms, comprising the steps of:

calculating interference patterns due to all display target objects;

detecting moving display target objects whose positions have been changed among the display target objects;

obtaining a distance between each moving display target object and a hologram plane;

limiting a region of calculations for interference fringes due to each moving display target object according to the distance obtained by the obtaining step;

separately re-calculating interference fringes due to each moving display target object within the region of calculations as limited by the limiting step; and producing a hologram to be displayed, by synthesizing interference fringes calculated by the calculating step and interference fringes recalculated by the separately re-calculating step.

4. A system for producing computer generated holograms of a plurality of display target objects arranged at different positions along a depth direction, comprising:

a distance detection unit for obtaining a distance between each display target object and a hologram plane;

a region limiting unit for limiting a region of calculations for interference fringes due to each display target object according to the distance obtained by the distance detection unit;

a calculation unit for separately calculating interference fringes due to each display target object within the region of calculations as limited by the region limiting unit; and a hologram production unit for producing a hologram to be displayed, by synthesizing separately calculated interference fringes due to all display target objects.

5. A system for producing a computer generated holograms of a plurality of display target objects arranged at different positions along a depth direction and including near distanced display target objects and far distanced display target objects, comprising:

a distance detection unit for obtaining a distance between each display target object and a hologram plane;

a region limiting unit for limiting a region of calculations for interference fringes due to each near distanced display target object for which the distance obtained by the distance detection unit is not greater than a prescribed threshold;

a first calculation unit for separately calculating interference fringes due to each near distanced display target object within the region of calculations as limited by the region limiting unit;

a second calculation unit for collectively calculating interference fringes as a projected image due to far distanced display target objects for which the distance obtained by the distance detection unit is greater than the prescribed threshold; and a hologram production unit for producing a hologram to be displayed, by synthesizing interference fringes calculated by the first calculation unit and interference fringes calculated by the second calculation unit.

6. A system for producing computer generated holograms, comprising:

a first calculation unit for calculating interference patterns due to all display target objects;

a motion detection unit for detecting moving display target objects whose positions have been changed among the display target objects;

a distance detection unit for obtaining a distance between each moving display target object and a hologram plane;

a region limiting unit for limiting a region of calculations for interference fringes due to each moving display target object according to the distance obtained by the distance detection unit;

a second calculation unit for separately re-calculating interference fringes due to each moving display target object within the region of calculations as limited by the region limiting unit; and a hologram production unit for producing a hologram to be displayed, by synthesizing interference fringes calculated by the first calculation unit and interference fringes re-calculated by the second calculation unit.

* * * * *